(12) United States Patent
Amemiya

(10) Patent No.: US 7,164,432 B1
(45) Date of Patent: Jan. 16, 2007

(54) INFORMATION PROCESSING APPARATUS AND METHOD THEREFOR, AND MEDIUM

(75) Inventor: Ryoji Amemiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/557,035

(22) Filed: Apr. 21, 2000

(30) Foreign Application Priority Data

Apr. 30, 1999 (JP) .............................. P11-125222

(51) Int. Cl.
*G09G 5/00* (2006.01)

(52) U.S. Cl. ..................................................... 345/649

(58) Field of Classification Search ................ 345/168, 345/169, 156, 173, 672, 650, 649; 463/30, 463/31; 348/919; 702/104
See application file for complete search history.

(56) References Cited

U.S. PATENT DOCUMENTS

| | | | | |
|---|---|---|---|---|
| 4,542,377 | A | | 9/1985 | Hagen et al. ................ 340/727 |
| 4,682,160 | A | * | 7/1987 | Beckwith et al. ............ 345/421 |
| 4,839,838 | A | | 6/1989 | LaBiche et al. ........ 364/709.11 |
| 5,134,390 | A | * | 7/1992 | Kishimoto et al. .......... 345/659 |
| 5,262,777 | A | | 11/1993 | Low et al. ..................... 341/20 |
| 5,440,326 | A | | 8/1995 | Quinn .......................... 345/156 |
| 5,453,758 | A | | 9/1995 | Sato ............................. 345/158 |
| 5,528,265 | A | | 6/1996 | Harrison ...................... 345/158 |
| 5,602,566 | A | | 2/1997 | Motosyuku et al. ......... 345/123 |
| 5,719,799 | A | | 2/1998 | Isashi .................... 364/705.01 |
| 5,781,165 | A | * | 7/1998 | Tabata ............................. 345/8 |
| 5,834,623 | A | * | 11/1998 | Ignagni ....................... 702/105 |
| 5,898,600 | A | * | 4/1999 | Isashi .......................... 708/105 |
| 5,949,408 | A | * | 9/1999 | Kang et al. .................. 345/169 |
| 5,986,634 | A | * | 11/1999 | Alioshin et al. ............. 345/649 |
| 6,011,585 | A | * | 1/2000 | Anderson .................... 348/272 |
| 6,115,025 | A | * | 9/2000 | Buxton et al. ............... 345/659 |
| 6,122,682 | A | * | 9/2000 | Andrews ....................... 710/65 |
| 6,137,468 | A | * | 10/2000 | Martinez et al. ............ 345/649 |

(Continued)

OTHER PUBLICATIONS

Rekimoto, Jun, "Tilting Operations for Small Screen Interfaces (Tech Note)." User Interface and Software Technology (UIST '96), 1996 pp. 1-2.*

(Continued)

*Primary Examiner*—Kee M. Tung
*Assistant Examiner*—Jin-Cheng Wang
(74) *Attorney, Agent, or Firm*—Oblon, Spivak, McClelland, Maier & Neustadt, P.C.

(57) ABSTRACT

The present invention can realize an information processing apparatus and a method therefor which can prevent a degraded visibility even if the posture of the information processing apparatus is changed in order to provide better portability or to prevent surrounding persons from snooping in the middle of a travel by displaying image information on a display surface and changing the display orientation by rotating the image information as required based on an angular component in a change of the posture of the display surface. Also, a medium causes an information processing apparatus to execute a program having a first step of displaying image information on a display surface, a second step of detecting an angular component in a change in the posture of the display surface, and a third step of changing the display orientation by rotating the image information based on the angular component, so that a degraded visibility can be prevented even if the posture of the information processing apparatus is changed in order to provide better portability or to prevent surrounding persons from snooping in the middle of a travel, thereby making it possible to readily use the information processing apparatus even in the middle of a travel.

21 Claims, 21 Drawing Sheets

U.S. PATENT DOCUMENTS

| | | | | |
|---|---|---|---|---|
| 6,154,214 A * | 11/2000 | Uyehara et al. | ............ | 345/863 |
| 6,154,359 A * | 11/2000 | Kamikakai et al. | ......... | 361/681 |
| 6,201,554 B1 * | 3/2001 | Lands | ........................ | 345/169 |
| 6,262,751 B1 * | 7/2001 | Chan | .......................... | 345/572 |
| 6,275,234 B1 * | 8/2001 | Iwaki | ......................... | 345/428 |
| 6,323,902 B1 * | 11/2001 | Ishikawa | .................... | 348/373 |
| 6,326,955 B1 * | 12/2001 | Ditzik | ........................ | 345/173 |
| 6,326,978 B1 * | 12/2001 | Robbins | ..................... | 345/654 |
| 6,380,921 B1 * | 4/2002 | Nakamura | ................... | 345/102 |
| 6,396,506 B1 * | 5/2002 | Hoshino et al. | ............ | 345/650 |
| 6,396,924 B1 * | 5/2002 | Suso et al. | ............. | 379/433.13 |
| 6,435,969 B1 * | 8/2002 | Tanaka et al. | ................ | 463/44 |
| 6,492,974 B1 * | 12/2002 | Nobuchi et al. | ............ | 345/156 |
| 6,493,216 B1 * | 12/2002 | Lin | ............................ | 361/681 |
| 6,504,707 B1 * | 1/2003 | Agata et al. | ................ | 361/681 |
| 6,567,101 B1 * | 5/2003 | Thomas | ...................... | 345/649 |
| 6,630,922 B1 * | 10/2003 | Fishkin et al. | .............. | 345/156 |
| 6,704,007 B1 * | 3/2004 | Clapper | ..................... | 345/204 |
| 6,822,662 B1 * | 11/2004 | Cook et al. | ................. | 715/788 |

OTHER PUBLICATIONS

IBM Technical Disclosure Bulletin, "Personal Computer with Integrated Global Positioning System," vol. 37, No. 02B, Feb. 1994, pp. 313-314.

* cited by examiner

INFORMATION PROCESSING APPARATUS AND METHOD THEREFOR, AND MEDIUM

BACKGROUND OF THE INVENTION

1. Field of the Invention

This invention relates to an information processing apparatus and the method therefor, and a medium, which are suitable, for example, for application in a notebook type personal computer.

2. Description of the Related Art

Conventionally, a notebook type personal computer has a display section supported on a predetermined edge of a base section in such a manner that the display section can be pivoted in a direction in which the display section approaches to one surface of the base section (hereinafter referred to the "closing direction") and in a direction, opposite thereto, in which the display section is brought away from the one surface of the base section (hereinafter referred to as the "opening direction").

The one surface of the base section comprises a key array having a plurality of operation keys arranged therein, while the display section comprises a liquid crystal panel on the inner surface which faces the one surface of the base section.

In this way, as this personal computer is brought into a state for exposing the key array and the liquid crystal panel (hereinafter, this state is referred to as the "open state"), by pivotally moving the display section in the opening direction relative to the base section, operation instructions can be entered through associated operations keys, and predetermined processing can be executed in response to respective operation instructions to display resultant processing products on the liquid crystal panel of the display section as image information.

Conversely, as the personal computer is brought into a state for covering the one surface of the base section with the display section (hereinafter, this state is referred to as the "closed state") by pivotally moving the display section in the closing direction relative to the base section, the personal computer can be readily carried about.

Since the personal computer configured as described above is small and thin enough to be convenient for carrying about, the user may carry with himself when he travels for commutation or the like. Also, the user may use the personal computer for viewing desired image information such as electronic mails, schedule and so on in a train or the like on his way to the office.

The liquid crystal panel, however, is installed such that image information is displayed in a correct orientation (hereinafter referred to as the "normal display state") rather than upside down, when the liquid crystal panel is viewed beyond the base section placed on a desk with the display section maintained in the open state.

Thus, for ensuring the visibility for image information displayed on the liquid crystal of the personal computer when in use, for example, in a train in the middle of a travel, it is necessary to place the personal computer in a posture substantially identical to that which should be taken when it is placed on a desk for use.

For example, when the user uses the personal computer in a standing posture in a train, the user is obliged to use it in such an unstable state in which the base section is held by one hand with operation instructions entered by the other hand, occasionally causing the user to erroneously let the personal computer fall.

In addition, when desired information is displayed on the liquid crystal panel in a train or the like in substantially the same posture as that which may be taken when the personal computer is used on a desk, the image information can be readily snooped by surrounding persons, thus presenting difficulties in protecting the user's privacy.

As is apparent, the foregoing personal computer implies problems of experiencing the inconvenience for use in the middle of a travel, although it is convenient for carrying about.

SUMMARY OF THE INVENTION

In view of the foregoing, an object of this invention is to provide an information processing apparatus which is capable of being readily used even in the middle of a travel, the method therefor, and a medium.

The foregoing object and other objects of the invention have been achieved by the provision of an information processing apparatus which comprises angular component detecting means for detecting an angular component in a plane parallel with a display surface, when the posture of the display surface is changed, and display orientation control means for displaying image information on the display surface, and for controlling a display orientation of the image information by rotating the image information in parallel with the display surface based on the result of detection on the angular component derived from the angular component detecting means.

As a result, even if the user changes the posture of the information processing apparatus used in the middle of a travel, in order to provide the user with better portability or in order to prevent surrounding persons from snooping image information, image information displayed on the display surface can be readily rotated to prevent a degraded visibility.

Also, in the present invention, an information processing method comprises a display step of displaying image information on a display surface, an angular component detecting step of detecting an angular component in a plane parallel with the display surface, when the posture of the display surface is changed, and a display orientation control step of controlling a display orientation of the image information by rotating the image information in parallel with the display surface based on the angular component detected at the angular component detecting step.

As a result, when the user uses an information processing apparatus in the middle of a travel, even if the user changes the posture of the information processing apparatus in order to provide better portability or in order to prevent surrounding persons from snooping image information displayed on the display surface, the displayed image information can be readily rotated to prevent a degraded visibility.

Further, in the present invention, a medium causes an information processing apparatus to execute a program having a display step of displaying image information on a display surface, an angular component detecting step of detecting an angular component in a plane parallel with the display surface, when the posture of the display surface is changed, and a display orientation control step of controlling a display orientation of the image information by rotating the image information in parallel with the display surface based on the angular component detected at the angular component detecting step.

As a result, with the information processing apparatus, even if the user changes the posture of the information processing apparatus in order to provide better portability or in order to prevent surrounding persons from snooping image information displayed on the display surface, the displayed image information can be readily rotated to prevent a degraded visibility.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) First Embodiment

Figure 1:
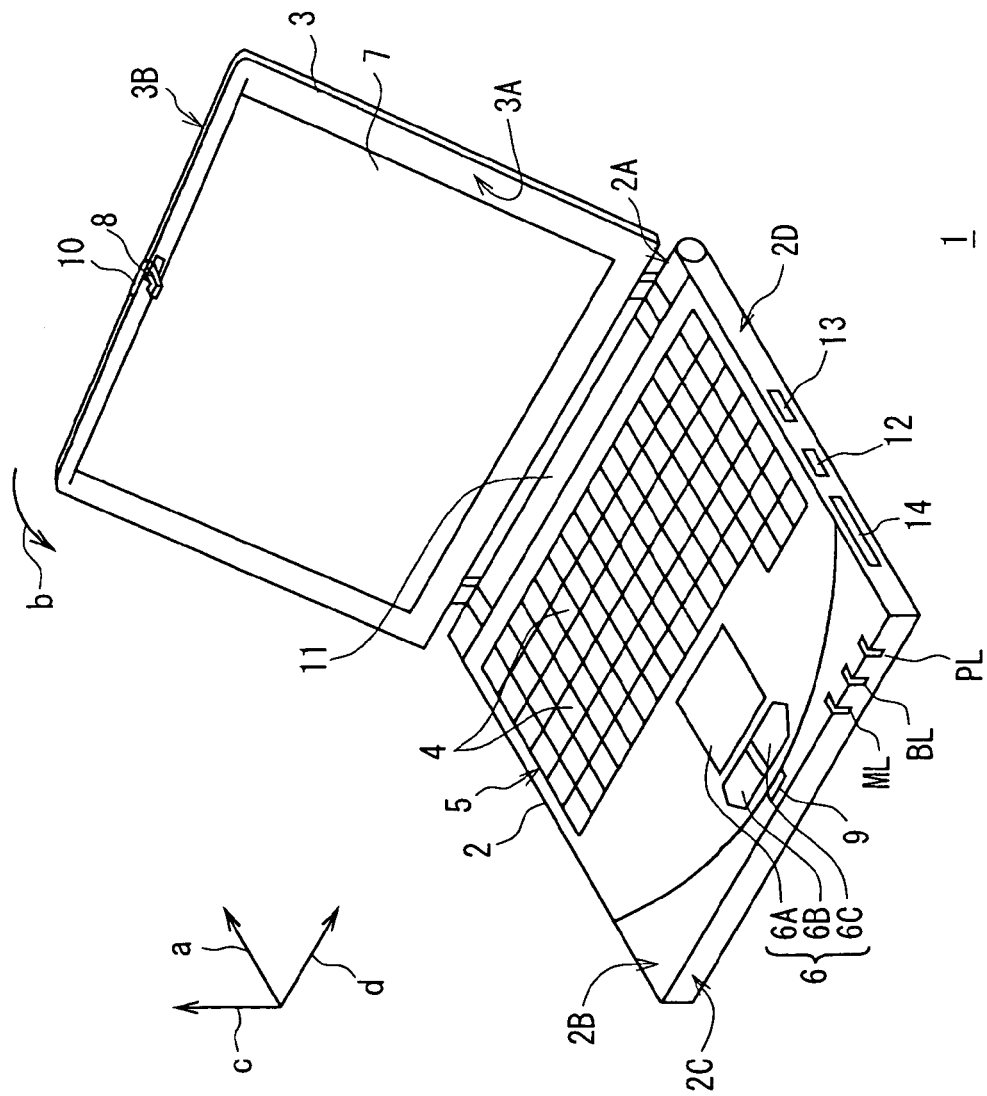
FIG. 1 is a schematic perspective view illustrating a first embodiment of the configuration of a notebook type personal computer according to the present invention.

In FIG. 1, a notebook type personal computer, generally designated by reference numeral 1, to which the present invention is applied, has a display section 3 supported by a back side wall 2A of a base section 2 indicated by an arrow a such that the display section 3 is arranged for pivotal movement with respect to one surface 2B of the base section 2 in a closing direction indicated by an arrow b and in an opening direction opposite thereto.

A key array 5 having a plurality of operation keys 4 arranged therein is provided on the rear side of the one surface 2B of the base section 2, and a touch pad 6 is provided on the front side of the one surface 2A as a pointing device. Specifically, the touch pad 6 is composed of a pressure sensitive detector 6A, and a left click button 6B and a right click button 6C which can accept operation instructions similar to left click and right click on a mouse.

On an inner surface 3A of the display section 3, a liquid crystal panel 7 is provided. A tab 8 is also provided at an end location of the inner surface 3A in an upward direction indicated by an arrow c, a hole 9 is formed at a predetermined position on the one surface 2B of the base section 2 which opposes the tab 8 when the display section 3 is brought into close proximity to the base section 2 in a closed state of the personal computer 1, so that the tab 8 is fitted into the hole 9 in the closed state.

Figure 2:
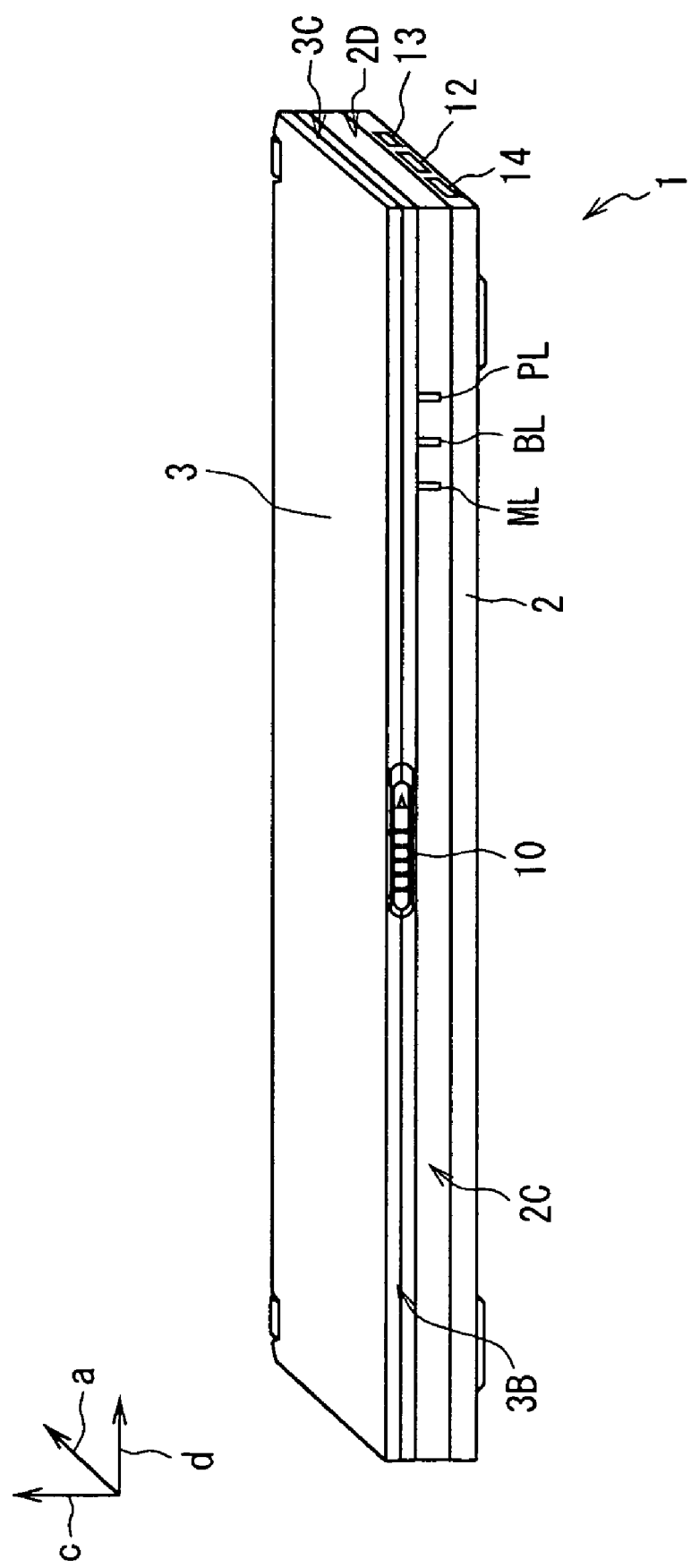
FIG. 2 is a schematic front view illustrating the configuration of a front side wall of the personal computer when it is in a closed state with a display section placed in close proximity to a base section.

A slide lever 10 is arranged on an upper side wall 3B of the display section 3 in correspondence to the tab 8 so as to be slidable in a right direction indicated by an arrow d and in a left direction opposite thereto. Thus, when the display section 3 is brought into close proximity to the base section 2 with the tab 8 fitted into the hole 9, as illustrated in FIG. 2, the slide lever 10 may be slid to lock the tab 8 into the hole 9 or to release the locked tab 8 from the hole 9.

With the personal computer 1 configured as described, when the display section 3 is pivoted in the closing direction toward the base section 2, the slide lever 10 locks the tab 8 fitted in the hole 9, so that the personal computer 1 can be carried in the closed state with the display section 3 held in close proximity to the base section 2.

On the other hand, when the slide lever 10 is slid to release the locked tab 8 fitted in the hole 9 in the closed state of the personal computer 1 with the display section 3 placed in close proximity to the base section 2, the display section 3 can be pivoted away from the base section 2 to bring the personal computer 1 into an open state, causing the key array 5 and the liquid crystal panel 7 to expose. Consequently, operation instructions can be entered through the key array 5, and predetermined processing can be executed in response to the thus entered operation instructions to display resultant processing products on the liquid crystal 7 as image information.

More specifically, a power indicator lamp PL, a battery indicator lamp BL and a message indicator lamp ML, each formed of a light emitting diode (LED), are arranged in combination on a front side wall 2C (FIG. 1) from the front right end location of the one surface 2B of the base section 2, in such a manner that the power indicator lamp PL, the battery indicator lamp BL and the message indicator lamp ML can be viewed in either of the open state and the closed state of the display section 3 relative to the base section 2.

A battery pack 11 is accommodated in a rear side wall 2A of the base section 2 such that the battery pack 11 appears to be integrated with the base section 2 and the display section 3 when the personal computer 1 is in the closed state with the display section 3 placed in close proximity to the base section 2.

Figure 3:
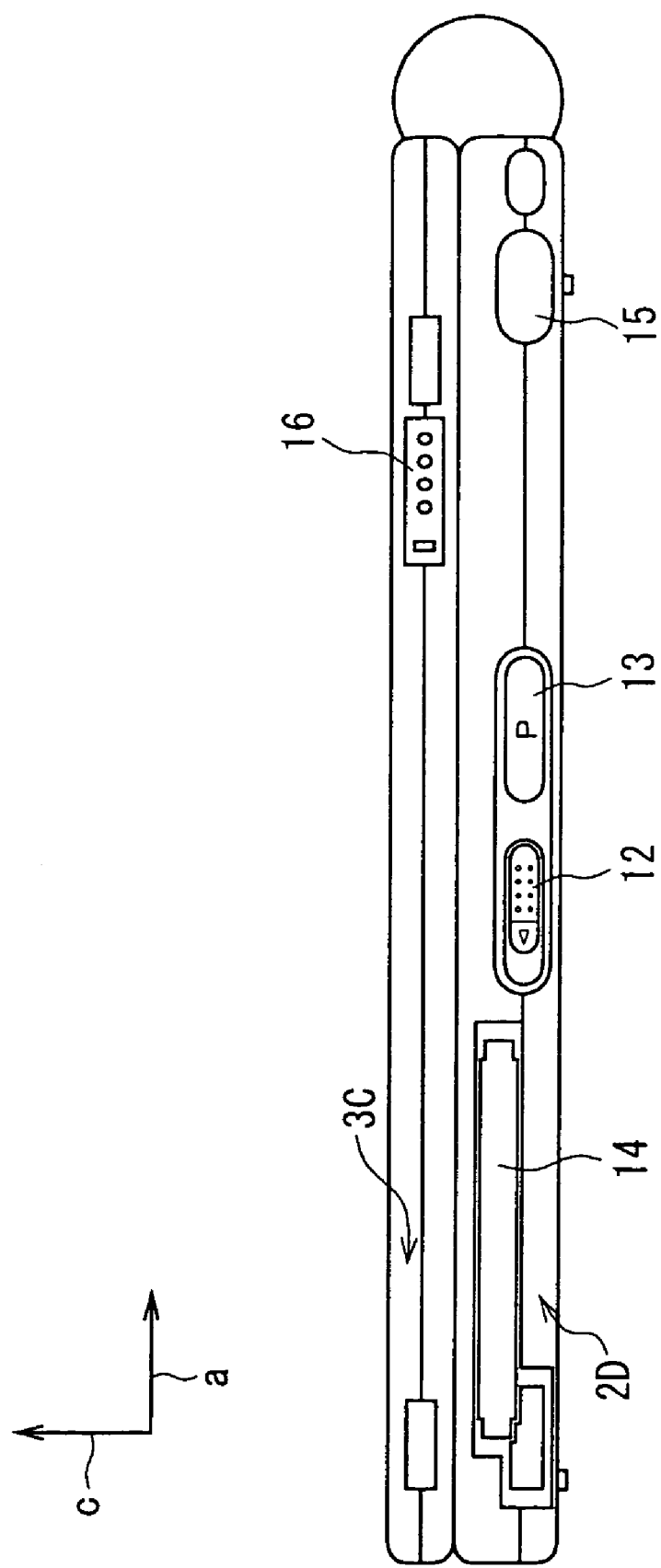
FIG. 3 is a schematic side view illustrating the configuration of a right side wall of the personal computer when it is in the closed state with the display section placed in close proximity to the base section.

Further, a power switch 12 and a programmable power key 13 are arranged substantially at a central location of a right side wall 2D of the base section 2, as illustrated in FIG. 3; a slot 14 is formed at a front end location of the right side wall 2D for inserting a Personal Computer Memory Card International Association (PCMCIA) card (so-called Personal Computer (PC) card); and an infrared communication port 15 is arranged at a rear end location for infrared data communications.

The display section 3 in turn comprises an external output terminal 16 for connection to stereo speakers on a right side wall 3C.

Figure 4:
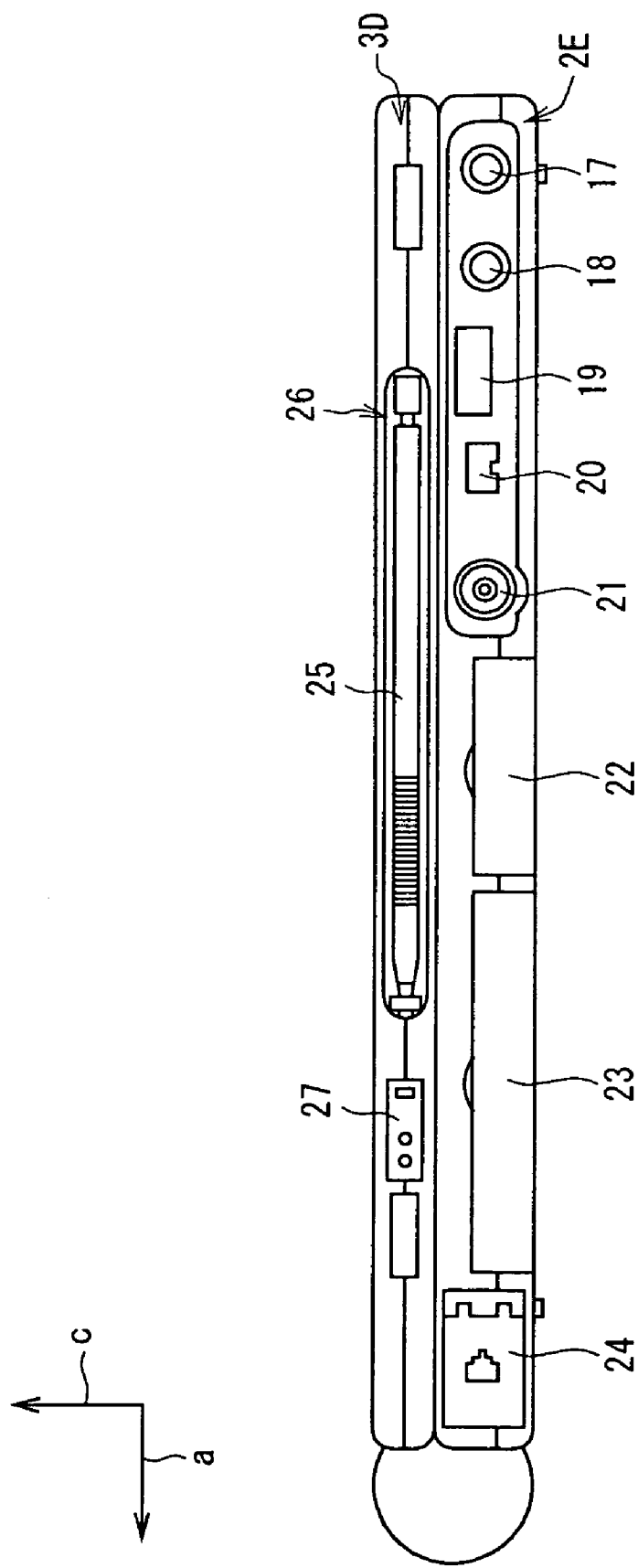
FIG. 4 is a schematic side view illustrating the configuration of a left side wall of the personal computer when it is in the closed state with the display section placed in close proximity to the base section.

Also, as illustrated in FIG. 4, a headphone terminal 17, an audio input terminal 18, a Universal Serial Bus (USB) connector 19, an Institute of Electrical and Electronics Engineers (IEEE) 1394 cable connector 20 supporting the IEEE 1394 interface, a Direct Current (DC) power input terminal 21, a floppy disk drive connector 22, a port replicator connector 23, and a modular jack 24 are provided in this order on a left side wall 2E of the base section 2 from the front end.

On a left side wall 3D of the display section 3, a pen holder pocket 26 is arranged to be openable and closable for removably accommodating a stylus pen 25 for use by the user to enter an operation instruction on the touch pad 6 (detector 6A), and an external output terminal 27 is provided for connection to stereo speakers.

Actually, within the personal computer 1, a Random Access Memory (RAM) 32 is connected to a Central Processing Unit (CPU) 30 through an internal bus 31 implemented by a Peripheral Component Interconnect (PCI) bus, and a PCMCIA card 33, which may be inserted into the slot 14 as required, is also connected to the CPU 30 also through the internal bus 31.

In this event, the CPU 30 serves as a controller for generally controlling and processing a variety of functions, and the PCMCIA card 33 may be inserted into the slot 14 as required for adding an extra function other than those previously set in the personal computer 1.

The internal bus 31 is connected to an external bus 34 implemented by the Industrial Standard Architecture (ISA) bus, to which connected are a hard disk drive 35, a microcontroller-based In/Out (I/O) controller 36, a keyboard controller 37, a touch pad controller 38, an interface 39, a Liquid Crystal Display (LCD) controller 40, and a modem 41.

More specifically, the hard disk drive 35 has previously stored on an internal hard disk, a variety of application programs such as an electronic mail program, an auto-pilot program and so on together with a predetermined Operating System (OS), where the OS is a basic program for executing basic operations in the personal computer 1 such as Windows 95 (a tradename of Microsoft Corporation) or the like.

The electronic mail program is a program for transmitting and receiving communications to and from a communication line such as a telephone line or the like, through a network, and may have an incoming mail acquiring function as an inherent function. The incoming mail function can execute processing for confirming whether or not a mail for the user (personal computer 1) has been received in an external mail server, and for acquiring the mail to the user (personal computer 1) if present in the mail server.

The auto-pilot program in turn is a program for sequentially executing a plurality of previously set processing or programs in a predetermined order which has been previously set.

The I/O controller 36 comprises a CPU 43, a Read Only Memory (ROM) 44 formed, for example, of Electrically Erasable and Programmable Read Only Memory (EE-PROM), and a RAM 45, which are interconnected to each other. The I/O controller 36 is connected to a current time counter 46 for continuously measuring and supplying the current time, and a battery 47 for backup.

The ROM 44 previously stores a basic input/output system 48 referred to as Basic Input/Output System (BIOS), a wake-up program 49, a key entry monitoring program 50, and a light emitting diode control program 51, while the RAM 45 is provided with a set time register 52, a key input status register 53, an operation key/program correspondence relation register 54, and a light emitting diode control register 55.

Here, the basic input/output system 48 is a software program for controlling transmission and reception (input/output) of data between the OS and a variety of application programs and peripherals (display section 3, key array 5, hard disk drive 35, and so on). The CPU 43 relies on the basic input/output system 48 to control the transmission and reception of data between the OS and a variety of programs and the peripherals.

The set time register 52 can store a time arbitrarily set by the user beforehand (hereinafter, this time is referred to as the "set time"), so that the CPU 43 detects whether or not the current time given from the current time counter 46 equals the set time stored in the set time register 52, based on the wake-up program, to instruct the execution of predetermined processing (or a program) when the set time is reached.

The key entry status register 53 can store an operation key flag. The CPU 43 monitors whether or not the programmable power key 13 for one-touch operation is depressed, based on the key entry monitoring program 50, and stores the operation key flag in the key input status register 53 when the programmable power key 13 is depressed.

The operation key/program correspondence relation register 54 can store a correspondence relation between a combination of the programmable power key 13 and a previously set operation key 4, and an application program which should be started in response to the combination. The CPU 43 sends control data to the CPU 30 sequentially through the external bus 34 and the internal bus 31 for starting the corresponding application program, when the programmable power key 13 and the previously set operation key are depressed in combination, thereby allowing the CPU 30 to start the corresponding application program based on the control data.

The light emitting diode control register 55 can store an end flag upon termination of the operation of the application program stored in the operation key/program correspondence relation register 54. The CPU 43 controls to turn on the message indicator lamp ML while the light emitting diode control register 55 stores the end flag, based on the light emitting diode control program 51.

More specifically, the I/O controller 36 is supplied with a power supply voltage for backup from the battery 47 even when the personal computer 1 is powered off by the power switch 12, thereby making it possible to hold values stored in the set time register 52, key entry status register 53, light emitting diode control register 55, and operation key/program correspondence relation register 54.

Upon powering on the personal computer 1 by the power switch 12, the CPU 43 supplies the power indicator lamp PL with a predetermined driving voltage to control lighting of the power indicator lamp PL. When the personal computer 1 is operated with the power supply voltage supplied from the battery pack, the CPU 43 supplies the battery indicator lamp BL with a predetermined driving voltage to control lighting of the battery indicator lamp BL. In this way, the user can be visually informed of a power-on state and a battery driven state of the personal computer 1.

An open/close detecting switch 56 is arranged within the hole 9 (FIG. 1) of the base section 2 for detecting an open/closed state of the display section 3 relative to the base section 2 in response to insertion/withdrawal of the tab 8 (FIG. 1) of the display section 3 into/from the hole 9. The CPU 43 sends the result of a detection provided by the open/close detecting switch 56 to the CPU 30 sequentially through the external bus 34 and the internal bus 31 as open-state information and closed-state information.

Thus, the CPU 30 can erase image information so far displayed on the liquid crystal panel 7, for example, in response to a transition from the open state to the closed state of the display section 3 relative to the base section 2, even when the personal computer 1 is powered on by the power switch 12, and can resume the so far erased display on the liquid crystal panel 7 in response to a transition from the closed state to the open state of the display section 3 relative to the base section 2.

Actually, as the personal computer 1 is powered on by the power switch 12, the CPU 30 reads the OS stored on the hard disk within the hard disk drive 35, and transfers the read OS to the RAM 32 sequentially through the external bus 34 and the internal bus 31 for storage, thereby steering the OS in an executable state.

Then, after starting the OS in the foregoing manner, the CPU 30 sends resultant image data (hereinafter referred to as "desktop image data") to the RAM 32 through the internal bus 31.

In this event, the RAM 32 contains a Video Random Access Memory (VRAM) 57, such that the CPU 30 once stores the desktop image data in the VRAM 57 and reads it therefrom as appropriate, and sends the read desktop image data to the LCD controller 40 through the internal bus 31 and the external bus 34 in sequence.

With the desktop image data sent thereto, the LCD controller 40 controls a back light 58 of the display section 3 to illuminate the liquid crystal panel 7 from the back side, and drives and controls the liquid crystal panel 7 based on the desktop image data to display a predetermined desktop screen including a plurality of icons on the liquid crystal panel 7.

In this state, as the user enters an operation instruction through a corresponding operation key 4 or the touch pad 6, the keyboard controller 37 and the touch pad controller 38 send the entered operation instruction to the CPU 30 through the external bus 34 and the internal bus 31 in sequence.

Then, the CPU 30 generates desktop image data based on the operation instruction given from the keyboard controller 37 and the touch pad controller 38, and sends the desktop image data to the LCD controller 40 sequentially through the VRAM 57, the internal bus 31 and the external bus 34 as mentioned above, thereby allowing the user to scroll a desktop screen displayed on the liquid crystal panel 7, or to move an arrow-shaped cursor on the desktop screen through the LCD controller 40.

Also, as the user gives a selection specifying instruction (clicking) through an associated operation key 4 or the touch pad 6 after the cursor has been moved onto a predetermined icon on the desktop screen as described above, the CPU 30 reads a corresponding application program, for example, stored in the hard disk within the hard disk drive 35 and transfers the read application program to the RAM 32 sequentially through the external bus 34 and the internal bus 31, stores it in the RAM 32, and starts it.

Then, the CPU 30 sends predetermined image data (hereinafter referred to as "window image data") resulting from the application program thus started, together with the desktop image data which has been generated in response to the selection specifying instruction, to the LCD controller 40 sequentially through the VRAM 57, the internal bus 31 and the external bus 34, in a similar manner to the above. Consequently, desired image information can be displayed as a plurality of windows overlapping on the desktop screen on the liquid crystal panel 7 through the LCD controller 40.

More specifically, the CPU 30 may generate speech data representative of an operation state, a manipulation state or the like as required, when an operation instruction is entered through the operation key 4 and the touch pad 6, or when the OS and an application program are being started, and sends the speech data to a speaker 59 through the interface 39 to generate a speech based on the speech data through the speaker 59. On the contrary, the interface 39 may also collect a speech through the microphone 59M and capture resultant speech data.

In addition, as a predetermined operation instruction associated with a communication is entered through a corresponding operation key 4 or a touch pad 6, the CPU 30 controls the modem 41 based on the entered operation instruction to establish a connection to a communication network, a mail server or the like sequentially through the modular jack 24, a public line network, and an Internet service provider.

In this way, the personal computer 1 can receive a mail addressed to the user (personal computer 1) which has been received in the mail server, or a desired home page or the like through the communication network, and window image data associated with the received mail and home page to the LCD controller 40 to display image information on the mail and the home page based on the window image data on the liquid crystal panel 7 as windows in a manner similar to the above.

In addition to the configuration described above, the personal computer 1 has the external bus 34 of the base section 2 connected to an input interface 60 which in turn is connected to a three-axis gyro sensor 61 mounted within the display section 3.

Figure 6:
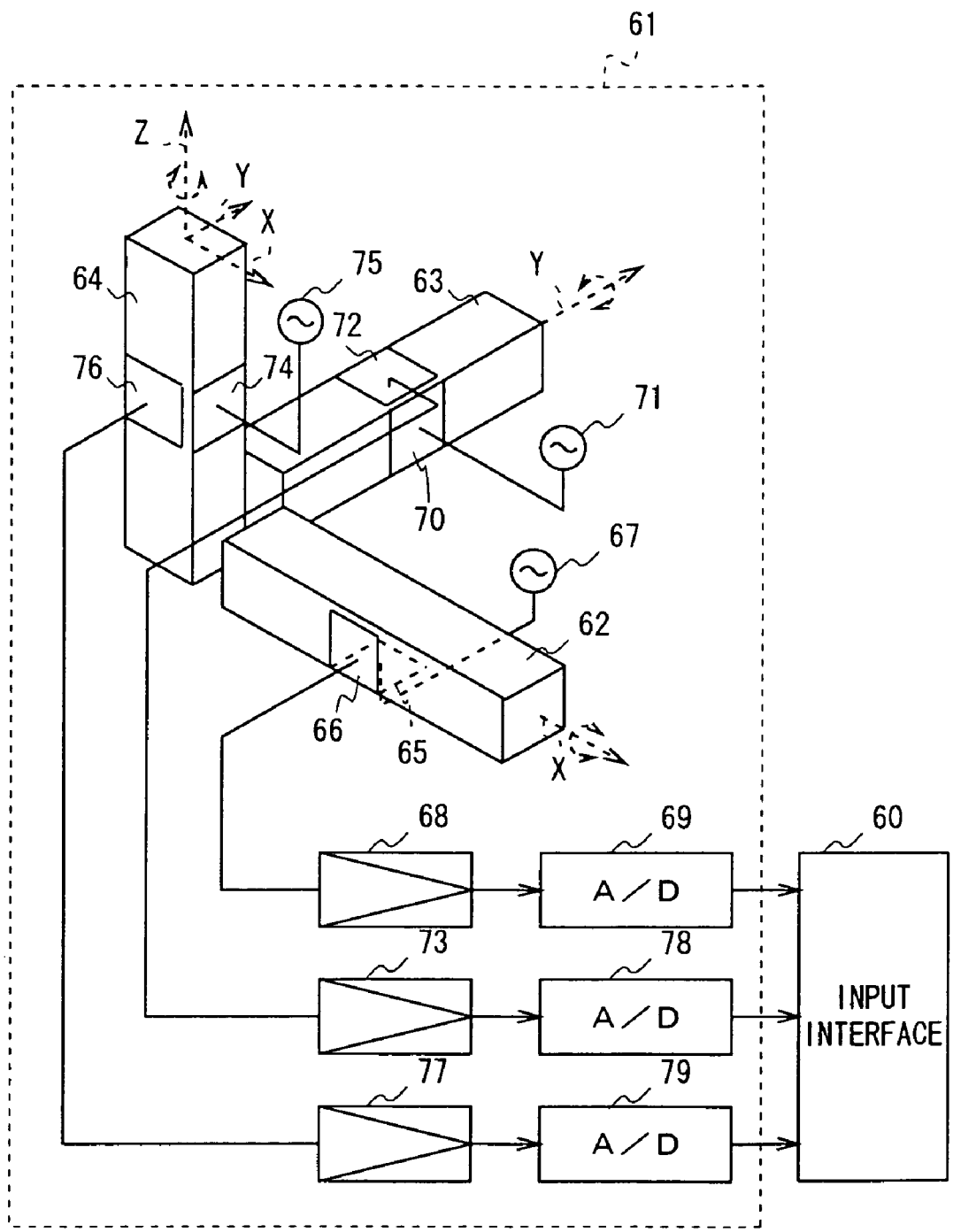
FIG. 6 is a block diagram illustrating the structure of a three-axis gyro sensor.

As illustrated in FIG. 6, the three-axis gyro sensor 61 has vibration gyros 62, 63, 64 corresponding to coordinate axes consisting of a virtual X-axis substantially parallel with a direction perpendicular to the panel surface of the liquid crystal panel 7; a virtual Y-axis substantially parallel with the longitudinal direction of the liquid crystal panel 7; and a virtual Z-axis substantially parallel with the width direction of the liquid crystal panel 7. The vibration gyros 62, 63, 64 are adapted to detect an angular velocity of rotation by sensing a Coriolis force based on the characteristics of a vibrating object which generates the Coriolis force in the direction perpendicular to the vibrations when it is applied with an angular velocity of rotation.

Actually, the vibration gyro 62 comprises a driving piezoelectric ceramic 65 and a detecting piezoelectric ceramic 66, and the driving piezoelectric ceramic 65 is applied with an alternating signal which is an oscillating output of an oscillator 67. As the vibration gyro 62 is rotated in a direction in this state, the detecting piezoelectric ceramic 66 is applied with a Coriolis force. As a result, the detecting piezoelectric ceramic 66 extracts a rotation angle velocity component about the X-axis in accordance with this Coriolis force as the amount of a change in voltage which is sent to an amplifier 68.

The amplifier 68 amplifies the voltage supplied from the detecting piezoelectric ceramic 66 to generate an angular velocity detecting signal in accordance with a signal level of the angular velocity component of rotation about the X-axis. Then, the angular velocity detecting signal is converted to digital data by an analog-to-digital converter 69, and the resultant angular velocity detecting data of rotation about the X-axis is sent to the input interface 60.

In addition, the vibration gyros 63, 64 also operate basically in a manner similar to the vibration gyro 62. Specifically, the vibration gyro 63 operates such that a detecting piezoelectric ceramic 72 extracts an angular velocity component of rotation about the Y-axis as the amount of a change in voltage, with a driving piezoelectric ceramic 70 applied with an alternating signal from an oscillator 71, and sends the voltage to an associated amplifier 73.

The vibration gyro 64 in turn operates such that a detecting piezoelectric ceramic 76 extracts an angular velocity component of rotation about the Z-axis as the amount of a change in voltage, with a driving piezoelectric ceramic 74 applied with an alternating signal from an oscillator 75, and sends the voltage to an associated amplifier 77.

Then, the amplifier 73, 77 amplify the signals supplied from the respective detecting piezoelectric ceramics 72, 76 associated therewith to generate an angular velocity detecting signal in accordance with a signal level of the angular velocity component of rotation about the Y-axis and an angular velocity detecting signal in accordance with a signal level of the angular velocity component of rotation about the Z-axis, respectively. These angular velocity detecting signals are converted to digital data by associated analog-to-digital converters 78, 79, and the resultant angular velocity detecting data about the Y-axis and the Z-axis are sent to the input interface 60.

When the personal computer 1 is in open state with the display section 3 pivotally moved away from the base section 2 and is displaying, for example, a multi-window screen comprising a desktop screen and a plurality of window screens on the liquid crystal panel 7, the CPU 30 captures the X-axis, Y-axis and Z-axis angular velocity detecting data from the input interface 60 sequentially through the internal bus 31 and the external bus 32 at predetermined operation periods.

Figure 7:
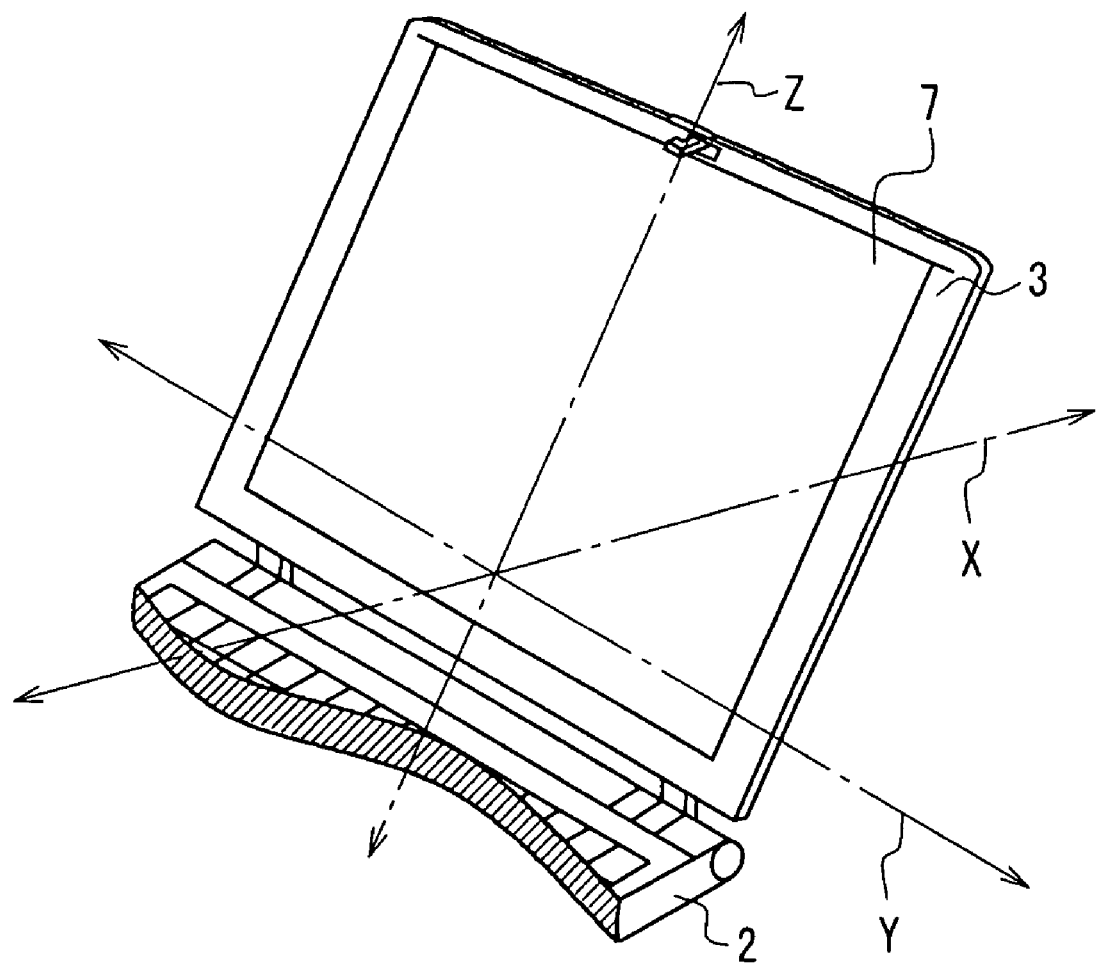
FIG. 7 is a schematic diagram used for explaining how to detect the angle of rotation of the display section.

Then, as illustrated in FIG. 7, the CPU 30 detects an angular component by which the display section 3 is rotated in parallel with the panel surface of the liquid crystal panel 7 (about the X-axis) (hereinafter particularly referred to as the "rotation angle") based on the X-axis angular velocity detecting data, and also detects an angular component of the rotation of the display section 3 about the Y-axis, and an angular component of the rotation of the display section 3 about the Z-axis based on the Y-axis angular velocity detecting data and the Z-axis angular velocity detecting data, respectively.

Here, the CPU 30 detects the angle of rotation of the display section 3 about the X-axis, for example, as an angle of inclination of the virtual Z-axis with respect to the vertical direction. Also, an angle range of inclination of the virtual Z-axis with respect to the vertical direction has been previously set corresponding to each of the upward, downward, left and right directions, in order to determine whether an end portion of the display section 3 comprising the tab 8 (FIG. 1) (hereinafter referred to as the "vertical end portion") is oriented in the upward, downward, left or right direction (hereinafter, this range is referred to as the "rotation angle range") when the user changes the posture of the display section 3.

With the configuration described above, as the CPU 30 detects a change in the posture of the display section 3 and hence the angle of rotation about the X-axis, the CPU 30 rotates the multi-window screen in parallel with the panel surface of the liquid crystal panel 7 based on the detected rotation angle and the rotation angle range to permit a change in a display orientation of the multi-window screen such that the user can view characters and so on in a correct orientation, rather than upside down, even if the posture of the display section 3 is changed.

Actually, upon starting the OS, the CPU 30 reads a predetermined first rotation display program previously stored on the hard disk within the hard disk drive 35, transfers the read first rotation display program to the RAM 32 for storage sequentially through the external bus 34 and the internal bus 31, and then starts the first rotation display program.

Figure 8:
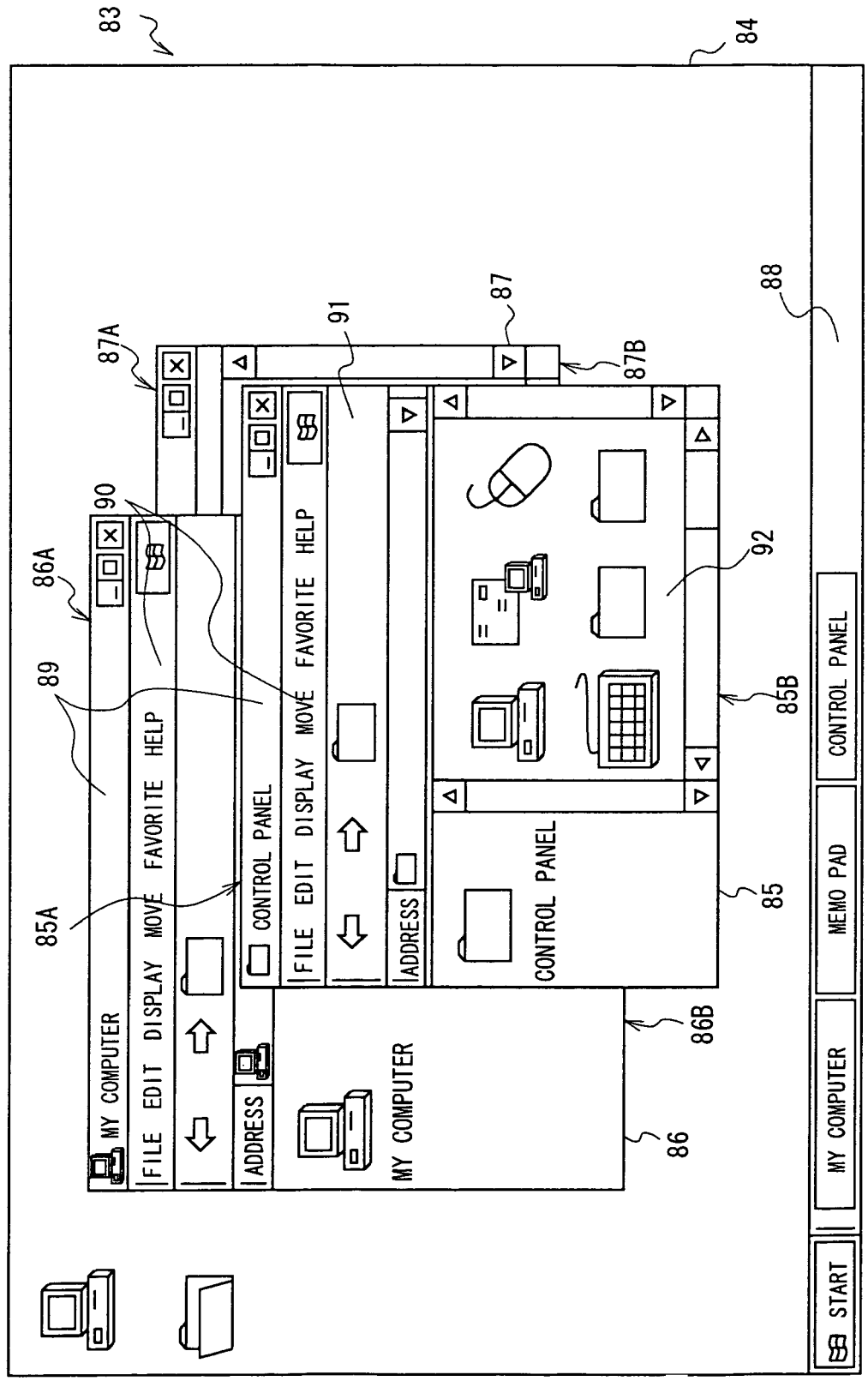
FIG. 8 is a schematic diagram illustrating a layout of a multi-window screen.

In the state mentioned above, when the desktop screen and a plurality of windows are demanded to display for example, the CPU 30 subsequently displays a multi-window screen 83 on the liquid crystal panel 7 of the display section 3 as illustrated in FIG. 8.

On the multi-window screen 83 thus displayed, a task bar 88 is displayed in a lower end portion of the desktop screen 84. The task bar 88 displays the names of application programs or files (My computer, Control Panel, and so on) corresponding to first to third windows 85 to 87, which are currently on the screen, together with a variety of icons.

The first to third windows 85 to 87 each comprise a title bar 89, a menu bar 90, a tool bar 91, and an image information display area 92 for displaying image information therein, in order from one end (hereinafter referred to as the "one window end") 85A to 87A to the other end (hereinafter referred to as the "other window end") 85B to 87B.

With the multi-window screen 83 left displayed on the liquid crystal panel 7, when the user rotates the display section 3, for example, over an angular distance of approximately 90 degrees in the clockwise direction in parallel with the panel surface of the liquid crystal panel 7 to result in a change in the posture of the display section 3, the CPU 30 detects the angle of rotation of the display section 3 about the X-axis (approximately 90 degrees in the clockwise direction), and executes rotation display processing for the multi-window screen 83 based on the detected angle of rotation and the rotation angle ranges in the respective upward, downward, left and right directions.

Specifically, in a normal display state of the multi-window screen 83, the CPU 30 stores desktop image data and window image data in the VRAM 57, and, when reading therefrom as appropriate, uses predetermined write addresses and read addresses such that the addresses from a write start position to a write end position match the addresses from a read start position to a read end position.

In addition, the CPU 30 has previously stored read addresses in the RAM 32 for use in displaying a rotated multi-window screen 83 on the liquid crystal panel 7, together with the normal write addresses and read addresses, such that as the CPU 30 detects the angle of rotation of the display section 3 about X-axis as mentioned above, the CPU 30 reads read addresses in accordance with the detected angle of rotation from the RAM 32, and uses them for display.

Thus, the CPU 30 stores desktop image data and window image data in the VRAM 57 using respective write addresses, and reads the desktop image data and the window image data stored in the VRAM 57 using read addresses in accordance with the detected angle of rotation about the X-axis, and sends the read addresses to the LCD controller 40.

Figure 9:
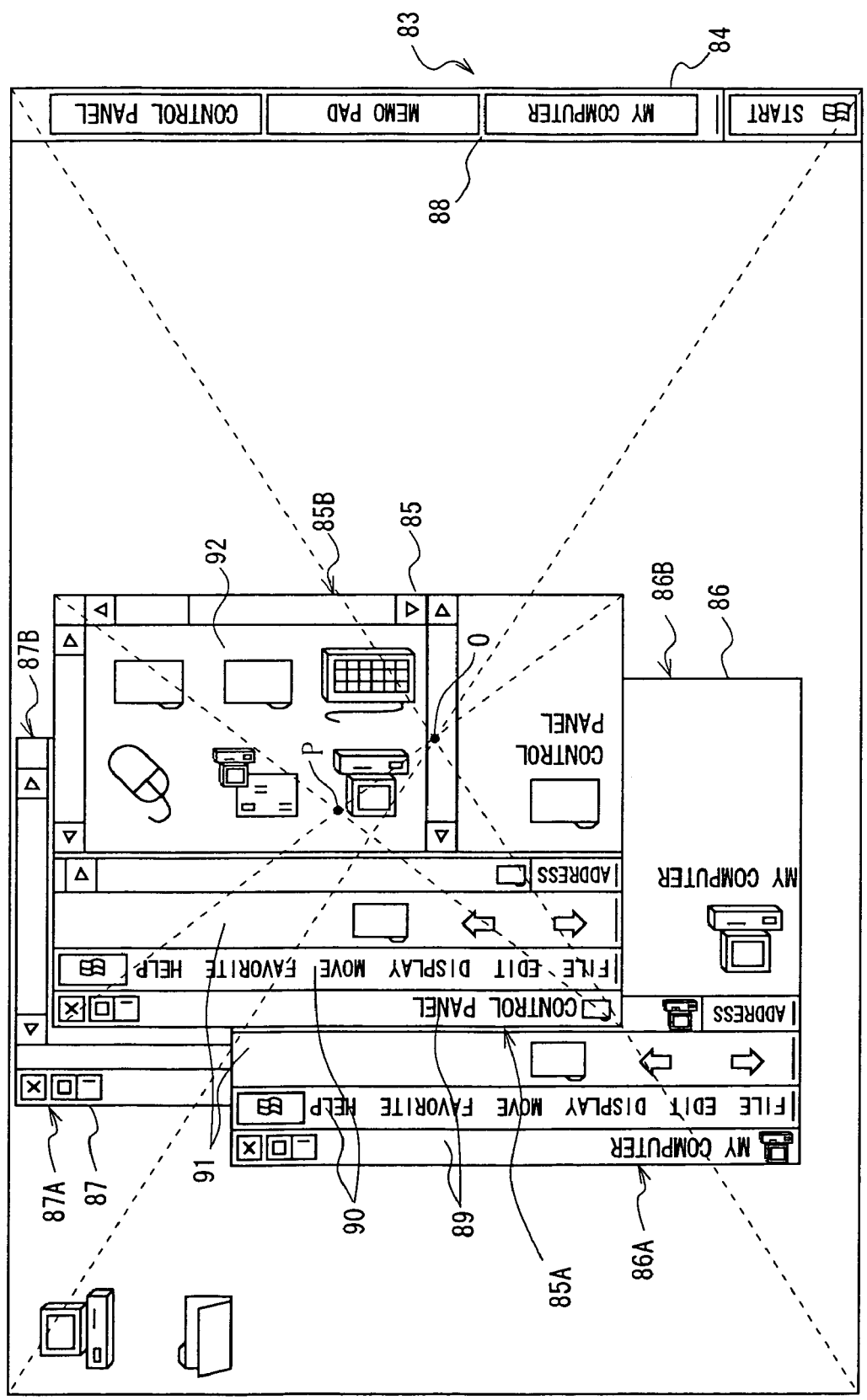
FIG. 9 is a schematic diagram used for explaining how to rotate a multi-window screen.

In this way, the CPU 30 displays on the liquid crystal panel 7 the desktop screen 84 rotated, for example, by approximately 90 degrees in the counter-clockwise direction about the intersection point O of the diagonals of the desktop screen 84 in parallel with the panel surface of the liquid crystal panel 7 through the LCD controller 40, as illustrated in FIG. 9. In addition, the CPU 30 displays the first to third windows 85 to 87 rotated, for example, by approximately 90 degrees in the counter-clockwise direction about the intersection points P of the diagonals of the respective windows in parallel with the panel surface of the liquid crystal panel 7 (in FIG. 9, the intersection point P of the first window 85 is only shown since the first to third windows 85 to 87 are overlapping with one another).

Consequently, when the user changes the posture of the personal computer 1 from a state in which he holds the base section 2 with both hands in a posture similar to that of the personal computer 1 placed on a desk to a state in which he rotates the personal computer 1, for example, just as he does with a book, and holds the base section 2 (or the display section 3) with one hand and the display section 3 (or the base section 2) with the other hand, the CPU 30 responsively rotates the multi-window display 83 displayed on the liquid crystal panel 7, thereby making it possible to show the image information by appropriately changing the display orientation such that characters and so on included in the image information are oriented in a correct orientation, rather than displayed upside down.

For reference, even when the desktop screen 84 only is being displayed on the liquid crystal panel 7, a change in the posture of the display section 3, if any, causes the CPU 30 to rotate the desktop screen 84 in parallel with the panel surface of the liquid display panel 7, so that the desktop screen 84 can be changed in orientation.

Figure 10:
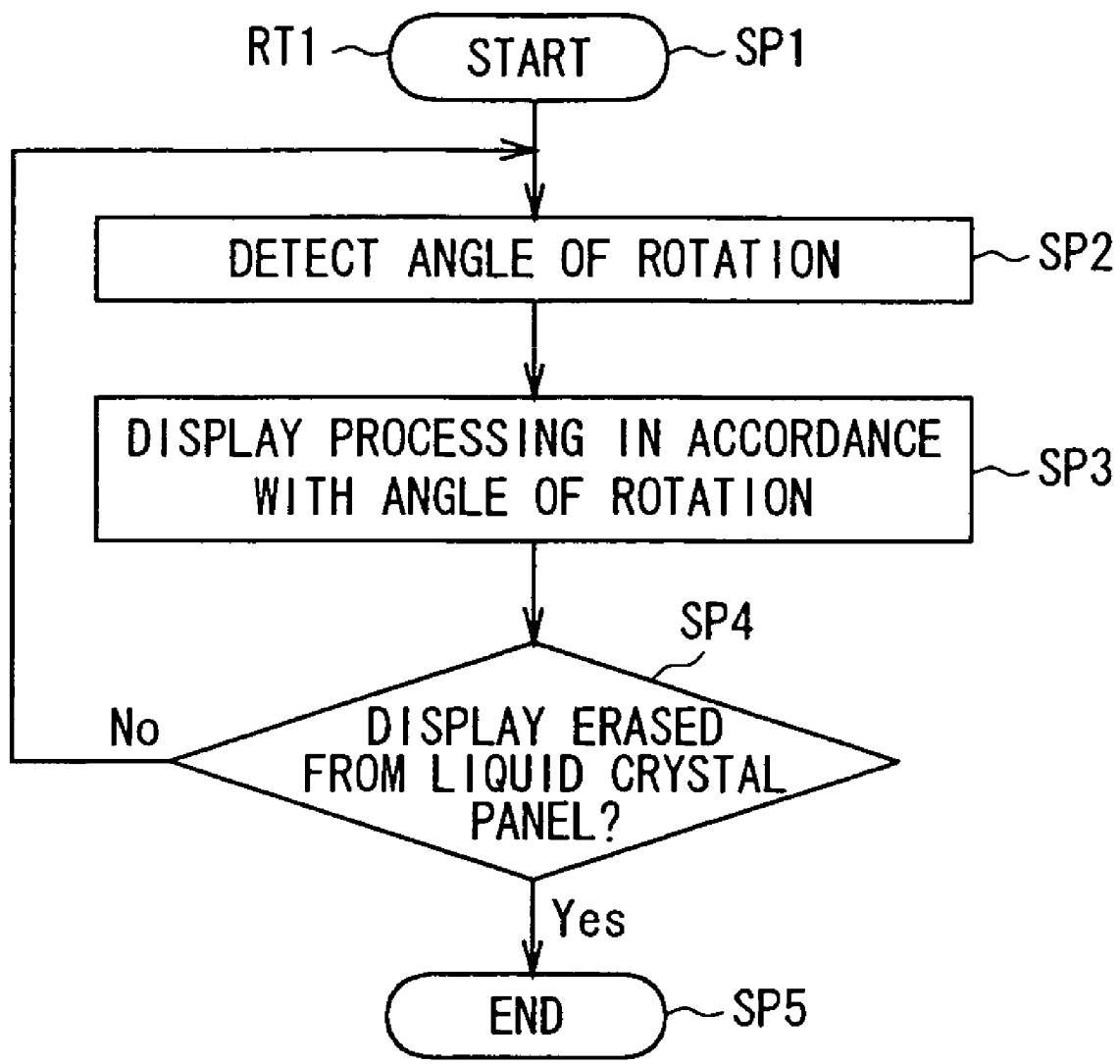
FIG. 10 is a flow chart illustrating a first rotation display processing procedure.

Actually, as the CPU 30 is displaying, for example, the multi-window screen 83 on the liquid crystal panel 7 of the display section 3, the CPU 30 starts a first rotation display processing procedure RT1 illustrated in FIG. 10 at step SP1, based on a first rotation display program. Subsequently, at step SP2, the CPU 3 captures X-axis angular velocity detecting data from the input interface 60 at predetermined operation periods, and detects the angle of rotation of the display section 3 about the X-axis based on the captured angular velocity detecting data.

Next, the CPU 30 proceeds to step SP3, where the CPU 30 reads addresses in accordance with the detected angle of rotation from the RAM 32 to read the desktop image data and the window image data from the VRAM 57 using the read addresses from the RAM 32, and sends the read image data to the LCD controller 40 sequentially through the internal bus 31 and the external bus 34.

In this way, the CPU 30 displays the multi-window screen 83 on the liquid crystal panel 7 through the LCD controller 40.

Next, the CPU 30 proceeds to step SP4, where it is determined whether or not the personal computer 1 is powered off by the power switch 12 and is closed with the display section 3 pivotally moved to close proximity to the base section 2 and with the display erased from the liquid crystal panel 7. When a negative result is returned because of the multi-window screen 83 remaining displayed on the liquid crystal panel 7, the CPU 30 returns to step SP2, and subsequently repeats a processing loop formed of the aforementioned steps SP4–SP2–SP3–SP4 until an affirmative result is returned at step SP4.

Conversely, when an affirmative result is returned at step SP4 because of the display erased from the liquid crystal panel 7, the CPU 30 proceeds to the subsequent step SP5, where the first rotation display processing procedure RT1 is terminated.

It should be noted that the CPU 30 detects the angle of rotation about the X-axis at predetermined operation periods, and displays the multi-window screen 83 on the liquid crystal panel 7 based on the detected angle of rotation to execute the display processing at step SP3 in accordance with the detected angle of rotation about the X-axis.

More specifically, even if the user changes the posture of the display section 3, the CPU 30 still uses read addresses which have been used before the change in the posture of the display section 3 if the angle of rotation about the X-axis is within the rotation angle range corresponding to any of the upward, downward, left and right directions, thereby preventing a change in the display orientation of the multi-window screen 83 on the liquid crystal panel 7.

On the contrary, if a change in the posture of the display section 3 causes the angle of rotation about the X-axis to change from the rotation angle range corresponding to any of the upward, downward, left and right directions to the rotation angle range corresponding to another direction, except for the former, the CPU 30 uses read addresses in accordance with the angle of rotation about the X-axis after the display section 3 has been changed in posture, in place of the read addresses which had been used before the change in the posture, consequently displaying on the liquid crystal panel 7 the multi-window screen 83 rotated in accordance with the angle of rotation about the X-axis after the display section 3 has been changed in posture.

Thus, even if the user changes the posture of the display section 3, the CPU 30 changes the orientation in which the multi-window screen 83 is displayed, based on the angle of rotation of the display section 3 about the X-axis detected in response to the change in the posture, and the rotation angle range, thereby making it possible to prevent unnecessary change in the display orientation of the multi-window screen 83, and accordingly prevent a degradation in visibility of the multi-window screen 83.

In the personal computer 1 having the configuration described above, while the multi-window screen 83 is being displayed on the liquid crystal panel 7 of the display section 3, the CPU 30 captures X-axis angular velocity detecting data from the input interface 60 at predetermined operation periods, and detects the angle of rotation of the display section 3 about the X-axis based on the captured X-axis angular velocity detecting data.

Then, as the CPU 30 detects that the user has changed the posture of the display section 3 such that the vertical upper end is oriented from any of the upward, downward, left and right directions to another direction except for this direction, based on the detected angle of rotation about X-axis, and the rotation angle range for each of the upward, downward, left and right directions, the CPU 30 rotates the multi-window screen 83 so far displayed on the liquid crystal panel 7 in accordance with the detected angle of rotation about the X-axis to change the orientation in which the multi-window screen 83 is displayed.

As appreciated, when the user merely changes the way he holds the personal computer 1 from such a posture which may be taken when the personal computer 1 is placed on the desk to a posture just as the user opens a book to change the posture of the display section 3, the personal computer 1 can readily rotate the multi-window screen 83 displayed on the liquid crystal panel 7 to prevent characters and so on from appearing upside down, without requiring special operations, even in a train or the like in the middle of a travel, thereby allowing the user to view the screen in a correct orientation.

In other words, even if the user changes the posture of the personal computer 1 so as to facilitate the way he holds it or so as to prevent surrounding persons from snooping the contents of a display on the liquid crystal panel 7 in a train or in the middle of a travel, the personal computer 1 can prevent a degradation in visibility of the multi-window screen 83 displayed on the liquid crystal panel 7.

More specifically, when the user holds the personal computer 1 in such a posture that the user holds a book open, a right-handed person may hold the base section 2 with the right hand, while a left-handed person may hold the base section 2 with the left hand, each one can readily manipulate the touch pad 6 with the more skillful hand to readily enter desired operation instructions, thereby making it possible to prevent a degradation in the operability even if the user changes the posture of the personal computer 1.

According to the configuration described above, the CPU 30 detects the angle of rotation of the display section 3 about the X-axis by the three-axis gyro sensor 61, and rotates the multi-window screen 83 displayed on the liquid crystal panel 7 based on the detected angle of rotation and the rotation angle ranges in the respective upward, downward left and right directions to change the orientation in which the multi-window screen 83 is displayed, so that the visibility for a display on the liquid crystal panel 7 can be prevented from being degraded even if the user changes the way he holds the personal computer 1 in a train or the like into a posture for facilitating the holding or into a posture for preventing surrounding persons from snooping the contents of a display, consequently making it possible to realize a personal computer which can be readily used even in the middle of a travel.

(2) Second Embodiment

Figure 5:
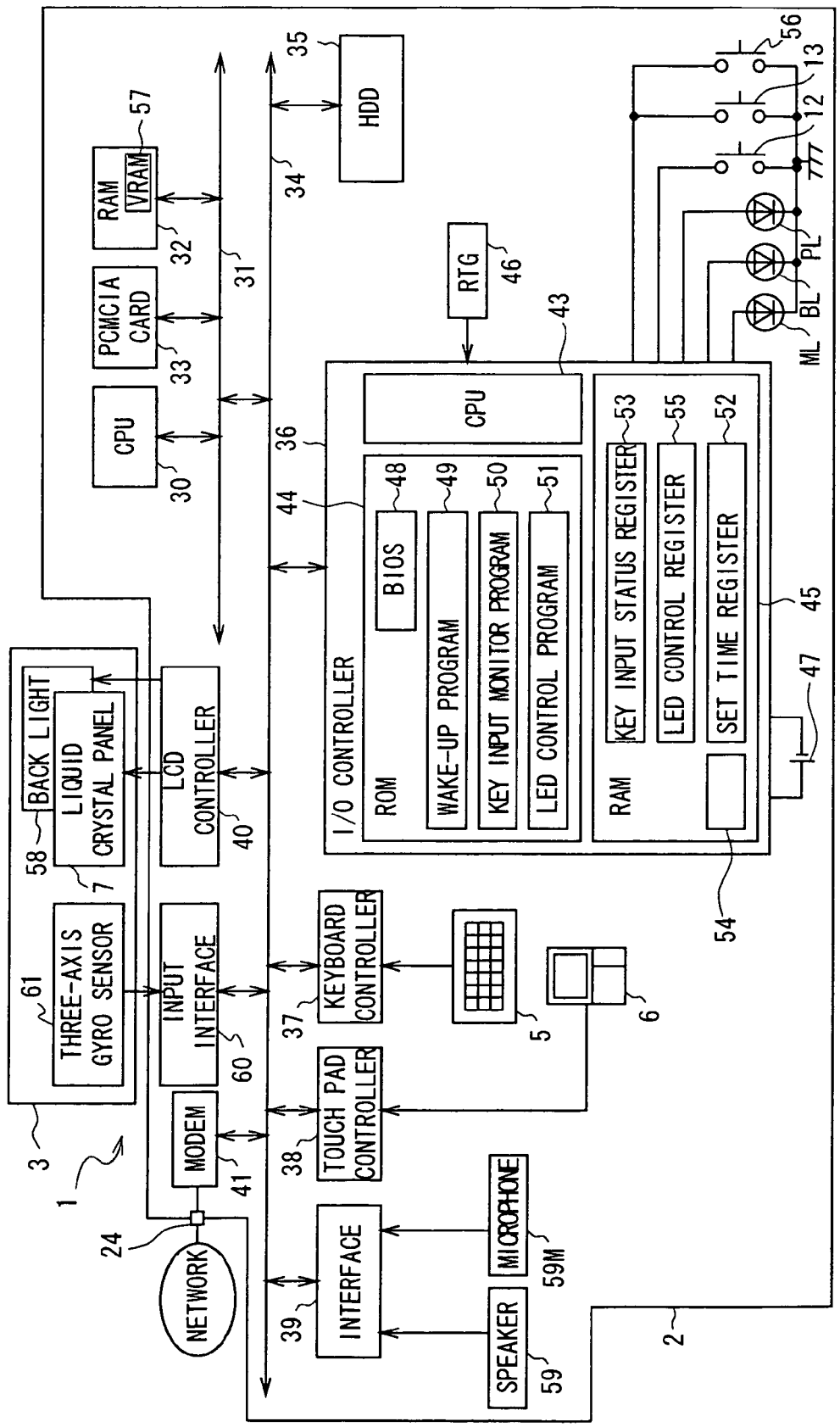
FIG. 5 is a block diagram illustrating the circuit configuration of the personal computer according to the first embodiment.
Figure 11:
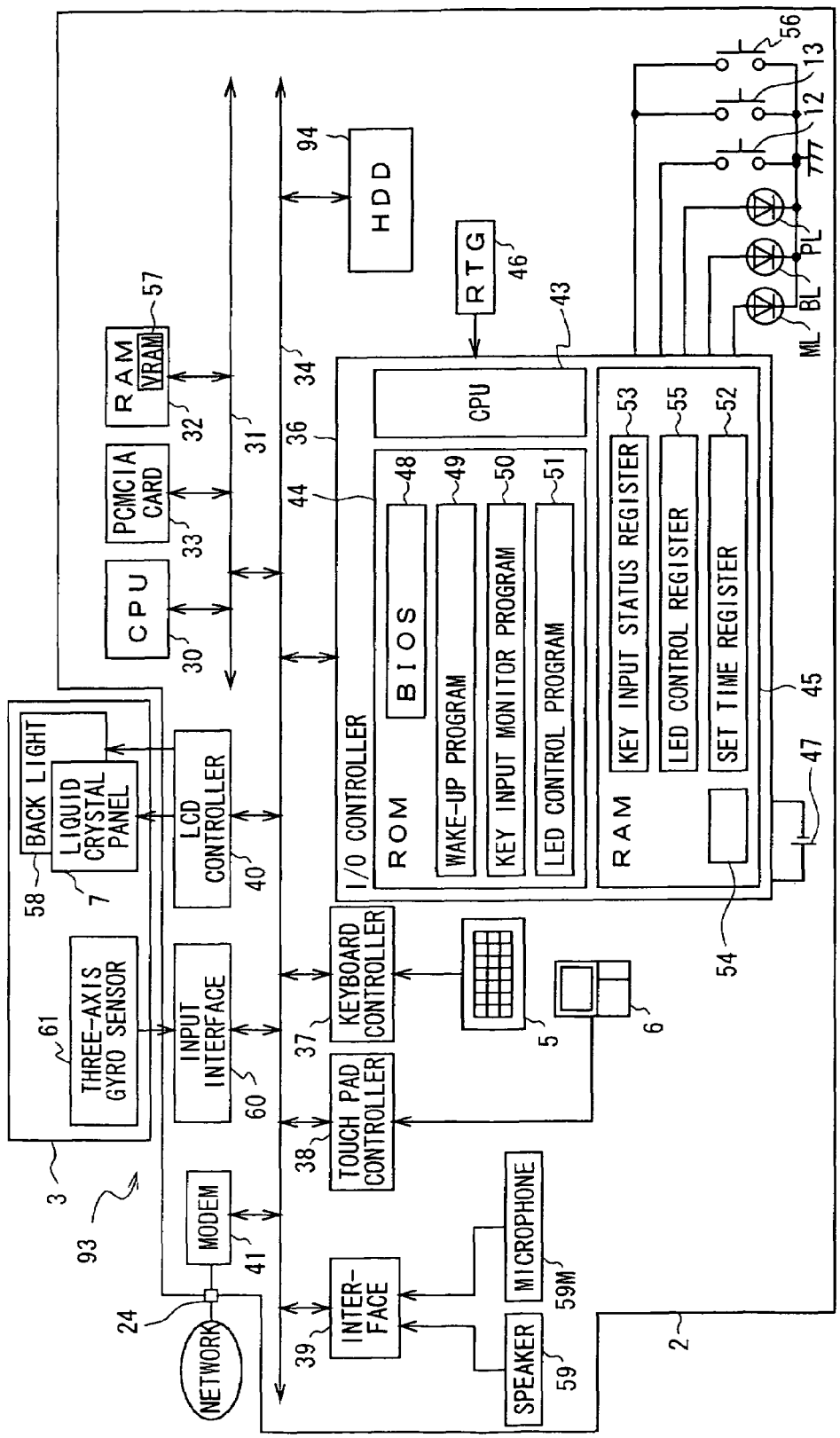
FIG. 11 is a block diagram illustrating the circuit configuration of a personal computer according to a second embodiment.

FIG. 11, in which parts corresponding to those in FIG. 5 are designated the same reference numerals, illustrates a personal computer 93 according to a second embodiment which is configured in a manner similar to the personal computer 1 according to the aforementioned first embodiment except for the configuration of a hard disk drive 94.

In this case, a hard disk in the hard disk drive 94 previously stores a predetermined second rotation display program in place of the aforementioned first rotation display program. Upon starting the OS, the CPU 30 continuously reads the second rotation display program from the hard disk in the hard disk drive 94, transfers it to the RAM 57 for storage therein, and then starts the second rotation display program.

Subsequently, as the user changes the posture of the display section 3 while a multi-window screen is being displayed on the liquid crystal panel 7 of the display section 3, the CPU 30 delays a predetermined time period, which has been previously set based on the second rotation display program, from the time the user changes the posture of the display section 3 to the time the multi-window screen is actually displayed in a different orientation.

In this way, even if a largely joggling train causes a large change in the posture of the display section 3 contrary to the user's will, for example, while the user is using the personal computer 93 in the train, the CPU 30 prevents the multi-window screen displayed on the liquid crystal panel 7 from being rotated by the delay time until the user returns the personal computer 1 to the original posture.

Figure 12:
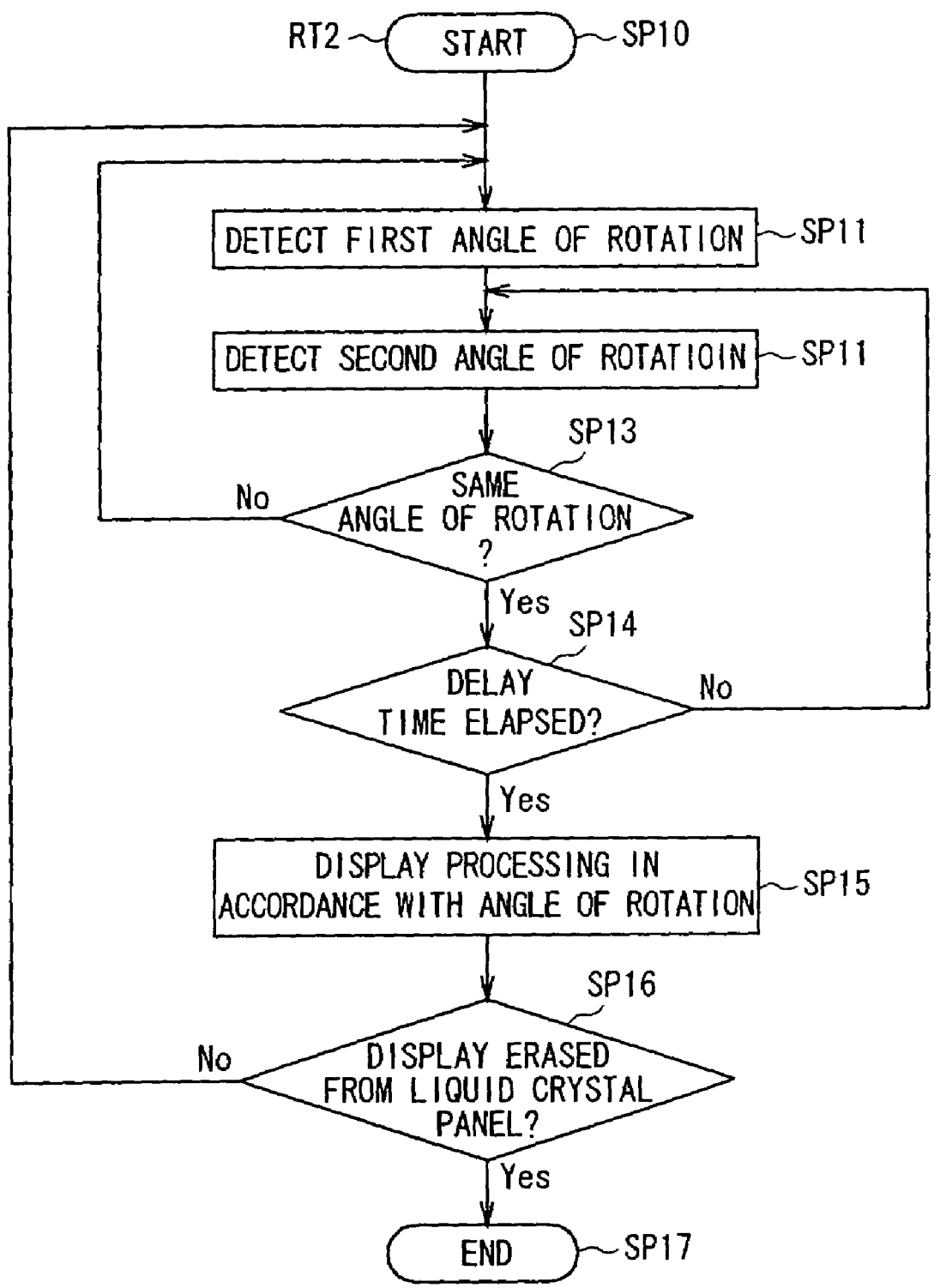
FIG. 12 is a flow chart illustrating a second rotation display processing procedure.

Actually, as the CPU 30 displays, for example, a multi-window screen on the liquid crystal panel 7 of the display section 3, the CPU 30 starts a second rotation display processing procedure RT2 illustrated in FIG. 12 at step SP10 based on the second rotation display program. Subsequently, at step SP11, the CPU 30 captures X-axis angular velocity detecting data from the input interface 60 at predetermined operation periods, and detects the angle of rotation of the display section 3 about the X-axis as a first rotation angle based on the captured angular velocity detecting data.

Next, the CPU 30 proceeds to step SP12, where the CPU 30 captures the X-axis angular velocity detecting data from the input interface 60 at the time the predetermined time period, which has been previously set, has been elapsed from the detection of the first rotation angle, and detects the angle or rotation of the display section 3 about the X-axis as a second rotation angle based on the captured angular velocity detecting data.

Then, the CPU 30 subsequently proceeds to step SP13, where the CPU 30 compares the first rotation angle with the second rotation angle to determine whether or not they are the same angle.

An affirmative result returned at step SP13 means that the first rotation angle is the same angle as the second rotation angle, and that the user has arbitrarily changed the posture of the display section 3, in which case the CPU 30 proceeds to the subsequent step SP14, where it is determined whether or not the previously set delay time has elapsed since the detection of the first rotation angle.

Then, if a negative result is returned at step SP14 due to the fact that the delay time has not elapsed since the detection of the first rotation angle, the CPU 30 returns to step SP12, where the CPU 30 again captures X-axis angular velocity detecting data from the input interface 60, and detects the angle of rotation of the display section 3 about the X-axis as a new second rotation angle based on the captured angular velocity detecting data.

Subsequently, the CPU 30 proceeds to step SP13, where the CPU 30 compares the first rotation angle detected at the aforementioned step SP11 with the second rotation angle newly detected at step SP12 to confirm again whether or not the user has arbitrarily changed the posture of the display section 3.

In this way, the CPU 30 sequentially repeats a processing loop formed of steps SP14–SP12–SP13–SP14 in the manner described above until it is determined at step SP14 that the delay time has elapsed since the detection of the first rotation angle, so that the CPU 30 compares the first rotation angle with the sequentially updated second rotation angle thus detected a plurality of times to confirm whether or not the user has arbitrarily changed the posture of the display section 3.

As an affirmative result is returned from the fact that the delay time has elapsed with the first rotation angle being coincident with the second rotation angle as mentioned, the CPU 30 proceeds to the subsequent step SP15, where the CPU 30 reads read addresses in accordance with the first rotation angle from the RAM 32 to read desktop image data and window image data from the VRAM 57 using the read addresses from the RAM 32, and sends the read image data to the LCD controller 40 sequentially through the internal bus 31 and the external bus 34.

In this way, the CPU 30 displays a multi-window screen on the liquid crystal panel 7 through the LCD controller 40, and when the user changes the posture of the personal computer 1 to orient the vertical upper end of the display section 3 from one of the upward, downward, left and right directions to another direction except the one direction, the CPU 30 rotates the multi-window screen on the liquid crystal panel 7 in accordance with the first rotation angle to change the orientation in which the multi-window screen is displayed.

Next, the CPU 30 proceeds to step SP16, where it is determined whether or not the personal computer 1 is powered off by the power switch 12 and is closed with the display section 3 pivotally moved to close proximity to the base section 2 and with the display erased from the liquid crystal panel 7. When a negative result is returned because of the multi-window screen remaining displayed on the liquid crystal panel 7, the CPU 30 returns to step SP11, and subsequently repeats a processing loop formed of the aforementioned steps SP16–SP11–SP12–SP13–SP14–SP15–SP16 until an affirmative result is returned at step SP16.

Conversely, when an affirmative result is returned at step SP16 because of the display erased from the liquid crystal panel 7, the CPU 30 proceeds to the subsequent step SP17, where the second rotation display processing procedure RT2 is terminated.

A negative result returned at step SP13 means that the first rotation angle is different from the second rotation angle, and that the user is in the midst of arbitrarily changing the posture of the display section 3, or is attempting to return the display section 3 to the original posture due to a change in the posture of the display section 3, contrary to the user's will, possibly caused by the joggling train or the like as mentioned above.

In this event, therefore, the CPU 30 returns to step SP11, where the CPU 30 again captures X-axis angular velocity detecting data from the input interface 60, and detects the angle of rotation of the display section 3 about the X-axis as a new first rotation angle based on the captured angular velocity detecting data.

Then, the CPU 30 proceeds to the subsequent step SP12, where the CPU 30 captures X-axis angular velocity detecting data from the input interface 60 at the time a predetermined time period has elapsed since the detection of the new first rotation angle, and detects the angle of rotation of the display section 3 about the X-axis as a new second rotation angle based on the captured angular velocity detecting data.

Again, at step SP13, the CPU 30 compares the newly detected first rotation angle with the second rotation angle, and repeats a processing loop formed of steps SP11–SP12–SP13 from the branching step SP13 to compare the first rotation angle with the sequentially updated second rotation angle thus detected, until the first rotation angle eventually becomes the same angle as the second rotation angle.

As an affirmative result is later returned at step SP13 in the manner described above, the CPU 30 proceeds to step SP14 to perform similar processing to the foregoing.

However, if a negative result is returned at least once at step SP13, this means that the user is in the midst of arbitrarily changing the posture of the display section 3, or the user is attempting to return the display section 3 to the original posture since the posture of the display section 3 has been changed contrary to the user's will. Thus, when the user has arbitrarily changed the posture of the display section 3, a rotated multi-window screen can be displayed accordingly on the liquid crystal panel 7. On the other hand, when the posture of the display 3 has been changed contrary to the user's will, the multi-window screen is displayed on the liquid crystal panel 7 such that the same display state is provided when the user returns the display section 3 to the original posture.

In the personal computer 93 having the configuration described above, the CPU 30 captures the X-axis angular velocity detecting data from the input interface 60 at predetermined operation periods while the multi-window screen 83 is being displayed on the liquid crystal panel 7 of the display section 3 to detect a first rotation angle of the display section 3 about the X-axis based on the captured X-axis angular velocity detecting data, detects a second rotation angle of the display section 3 about the X-axis at a time different from the time at which the first rotation angle was detected, and compares the first rotation angle with the second rotation angle.

Then, when the first rotation angle is the same angle as the second rotation angle, the CPU 30 determines that the user has arbitrarily changed the posture of the display section 3, sequentially updates the second rotation angle to produce new second rotation angles, and sequentially compares the first rotation angle with the new second rotation angle for a predetermined delay time, and then changes the display orientation of the multi-window screen on the liquid crystal panel 7 after the delay time has elapsed.

On the other hand, when the first rotation angle is different from the second rotation angle, the CPU 30 determines that the user is in the midst of arbitrarily changing the posture of the display section 3, or is attempting to return the display section 3 to the original posture due to a change in the posture of the display section 3 contrary to the user's will. The CPU 30 compares the first rotation angle with the sequentially updated second rotation angle. When the first rotation angle becomes the same angle as the second rotation angle, the CPU 30 sequentially updates only the second rotation angle, and compares the first rotation angle with the updated second rotation angle for a predetermined delay time. After the lapse of the delay time, the CPU 30 changes or does not change the orientation in which the multi-window screen is displayed on the liquid crystal panel 7.

As appreciated, in the personal computer 93, the CPU 30 actually changes the orientation in which the multi-window screen is displayed on the liquid crystal panel 7 after the lapse of the predetermined delay time since a change in the posture of the display section 3, so that when the user has arbitrarily changed the posture of the display section 3, the CPU 30 can change the display orientation of the multi-window screen on the liquid crystal panel 7 in accordance with the change in the posture without fail. On the other hand, even if a largely joggling train or the like causes a large change in the posture of the display section 3 contrary to the user's will while the user is using the personal computer 93 in the train, the CPU 30 can avoid changing the orientation in which the multi-window screen is displayed on the liquid crystal panel 7.

As a result, even if the posture of the display section 3 is largely changed contrary to the user's will while the user is using the personal computer 93, it is possible to prevent an unnecessary change in the display orientation of the multi-window screen currently appearing on the liquid crystal panel 7 until the user returns the display section 3 to the original posture, and consequently prevent a degradation in the visibility for the multi-window screen displayed on the liquid crystal panel 7.

According to the configuration described above, when the user has changed the posture of the display section 3, the CPU 30 sequentially updates and detects the angle of rotation of the display section 3 about the X-axis at different times until a predetermined delay time is elapsed, and compares the resulting first rotation angle with the second rotation angle. After the delay time has elapsed, the CPU 30 changes the orientation in which a multi-window screen is displayed on the liquid crystal panel 7. Thus, in addition to the effect produced in the aforementioned first embodiment, even if the posture of the display section 3 is largely changed contrary to the user's will, the multi-window screen can be prevented from suffering from a degraded visibility until the display section 3 is returned to the original posture, thereby making it possible to improve the usability of the personal computer.

(3) Third Embodiment

Figure 13:
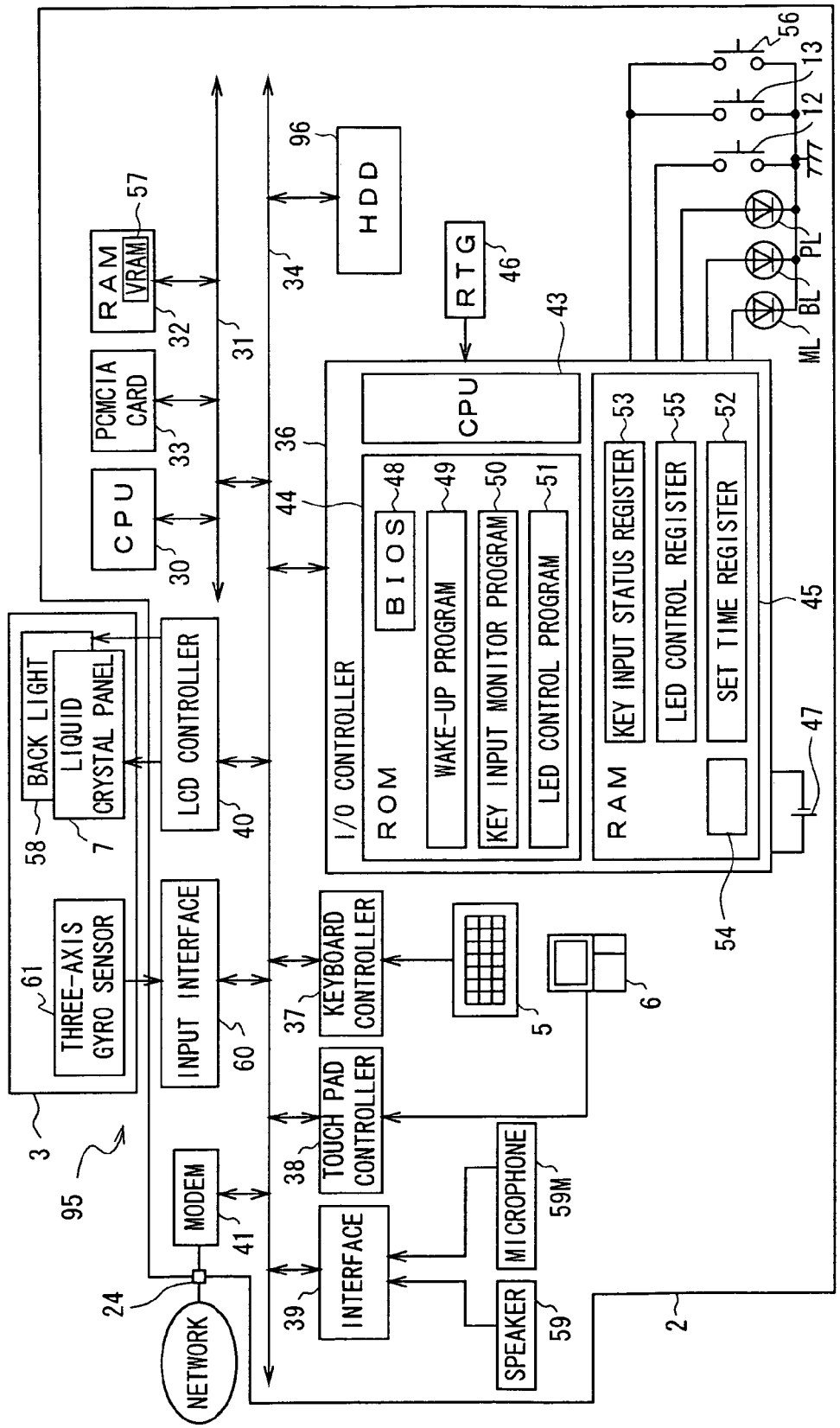
FIG. 13 is a block diagram illustrating the circuit configuration of a personal computer according to a third embodiment.

FIG. 13, in which parts corresponding to those in FIG. 1 are designated the same reference numerals, illustrates a personal computer 95 according to a third embodiment which is configured in a manner similar to the aforementioned personal computer 93 according to the second embodiment except for the configuration of a hard disk drive 96.

In this embodiment, a hard disk in the hard disk drive 96 previously stores a predetermined third rotation display program in place of the aforementioned second rotation display program. Upon starting the OS, the CPU 30 continuously reads the third rotation display program from the hard disk in the hard disk drive 96, transfers it to the RAM 57 for storage therein, and then starts the third rotation display program.

Figure 14:
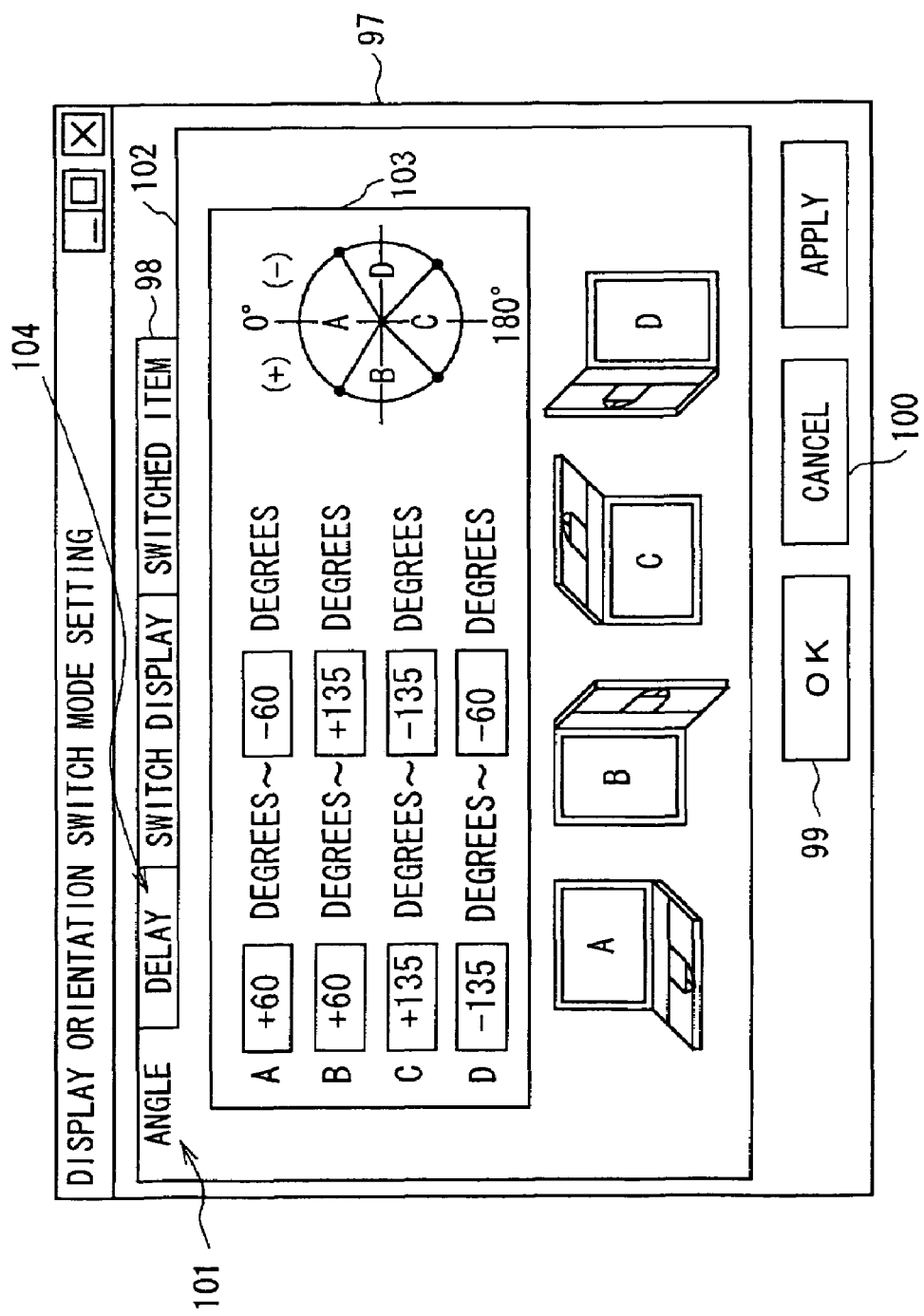
FIG. 14 is a schematic diagram illustrating a layout of an angle setting area in a display mode setting screen.

Then, as the user requests through the key array 5 or the touch pad 6 to display a predetermined setting screen in the state mentioned above, the CPU 30 displays a display mode setting screen 97 illustrated in FIG. 14 on the liquid crystal panel 7.

The display mode setting screen 97 includes a menu bar 98, a decision button 99 for deciding settings for a variety of conditions, and a cancel button 100 for canceling settings once decided for a variety of conditions.

Here, as the user moves a cursor onto an angle setting field 101 in the menu bar 98 and clicks a mouse on this field, the CPU 30 displays an angle setting area 102 within the display mode setting screen 97.

The angle setting area 102 has an angle range setting field 103 which allows the user to arbitrarily set a rotation angle range for determining four possible postures A–D assumed for the display section 3 as a range of angles of inclination of a virtual Z-axis within a span extending from +180 degrees to −180 degrees based on the vertical direction (zero degrees).

More specifically, in the angle range setting field 103, the user may enter a rotation angle range for determining four postures for the display section 3 through the key array 5 and the touch pad 6.

Figure 15:
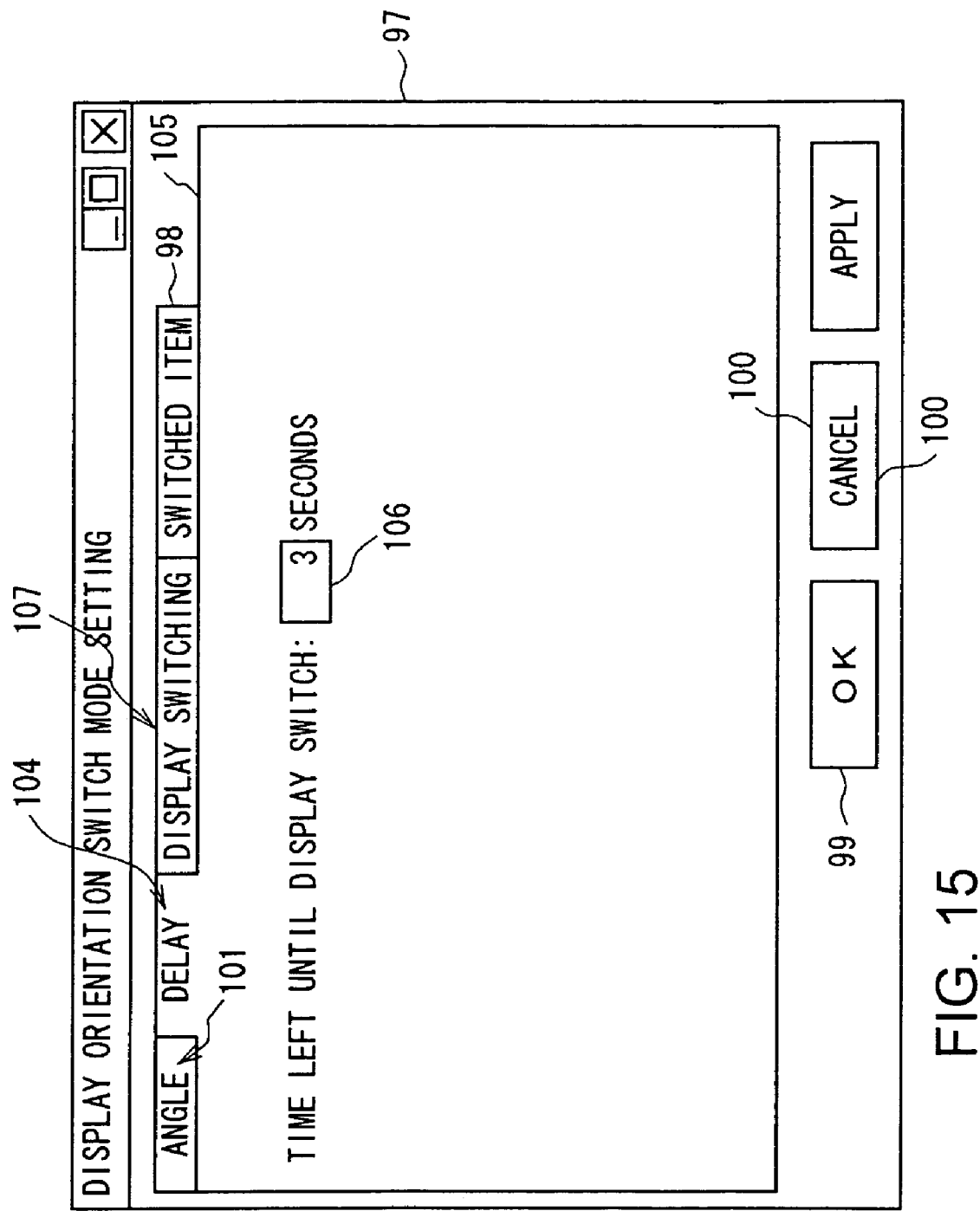
FIG. 15 is a schematic diagram illustrating a layout of a delay setting area in the display mode setting screen.

Also, when the user moves the cursor onto a delay setting field 104 in the menu bar 98 of the display mode setting screen 97, and clicks the mouse on the field 104, the CPU 30 displays a delay setting area 105 in the display mode setting screen 97 as illustrated in FIG. 15.

The delay setting area 105 includes a delay time display field 106 for arbitrarily setting a delay time from a change in the posture of the display section 3 to an actual change in the orientation in which a multi-window screen is displayed on the liquid crystal panel 7. A desired value may be entered for the delay time through the key array 5 and the touch panel 6.

As described above, since the rotation angle range for determining four postures of the display section 3 can be set over a relatively wide extension just like dividing a circle into four, so that even if the posture of the display section 3 is changed contrary to the user's will, it is possible to prevent an unnecessary change in the display orientation of a multi-window screen displayed on the liquid crystal panel 7 by the previously set rotation angle range as long as the change in the posture is not so large.

Also, when the delay time is also selected in addition to the setting of the rotation angle range, it is possible to prevent an unnecessary change in the display orientation of a multi-window screen displayed on the liquid crystal panel 7 even if the posture of the display 3 is changed contrary to the user's will beyond the rotation angle range.

Figure 16:
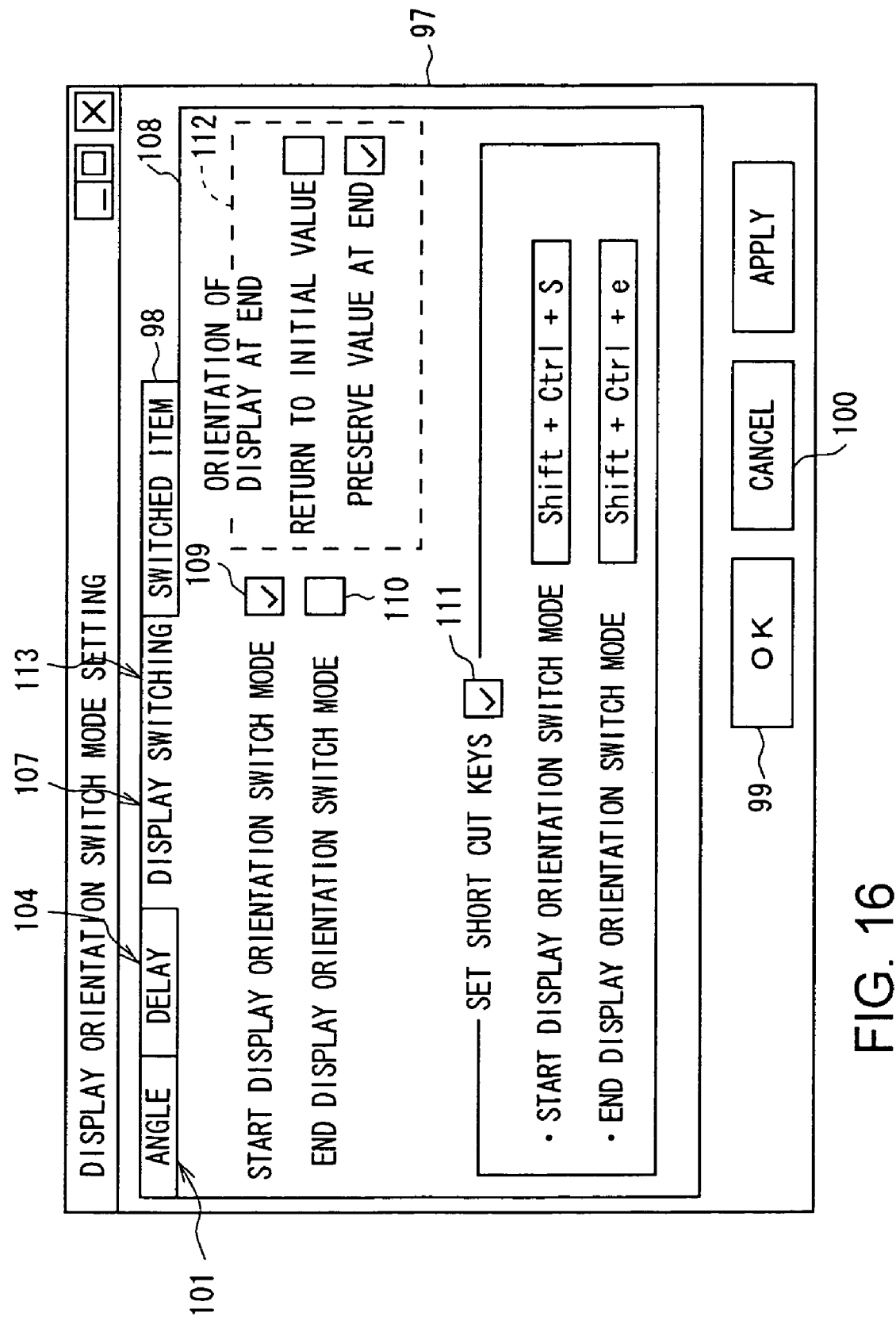
FIG. 16 is a schematic diagram illustrating a layout of a display switch setting area in the display mode setting screen.

Further, when the user moves the cursor onto a display switch setting field 107 in the menu bar 98 of the display mode setting screen 97 and clicks the mouse on the field 107, the CPU 30 displays a display switch setting area 108 in the display mode setting screen 97, as illustrated in FIG. 16.

The display switch setting area 108 includes check boxes 109, 110 for "start display orientation switching mode" and "end display orientation switching mode," respectively.

When the user checks in the check box 109, the display section 3 can be set to switch the display orientation of a multi-window screen in response to a change in the posture of the display section 3 while the multi-window screen is being displayed on the liquid crystal panel 7.

On the other hand, when the user checks in the check box 110, the display section 3 can be set not to switch the display orientation of a multi-window screen even if the posture of the display section 3 is changed while the multi-window screen is being displayed on the liquid crystal panel 7.

The display switch setting area 108 also includes a check box 111 for arbitrarily starting or ending the switching of the orientation in which a multi-window screen is displayed.

The check box 111 is valid only when the check box 109 is checked. The check box 111, when checked, can be selected in combination with an operation key 4 for arbitrarily starting the switching of the display orientation, or in combination with an operation key 4 for arbitrarily ending the switching of the display orientation.

The display switch setting area 108 further includes a display setting area 112 for allowing the user to set an orientation in which a multi-window screen is displayed on the liquid crystal panel 7, when the switching of the display orientation is ended.

The display setting area 112 is valid only when the check box 109 is checked, and allows the user, when the switching of the display orientation is arbitrarily ended, to select whether a multi-window screen continuously displayed on the liquid crystal panel 7 is returned to a normal display state, or the display orientation of the multi-window screen on the liquid crystal panel 7 at this time is preserved.

Figure 17:
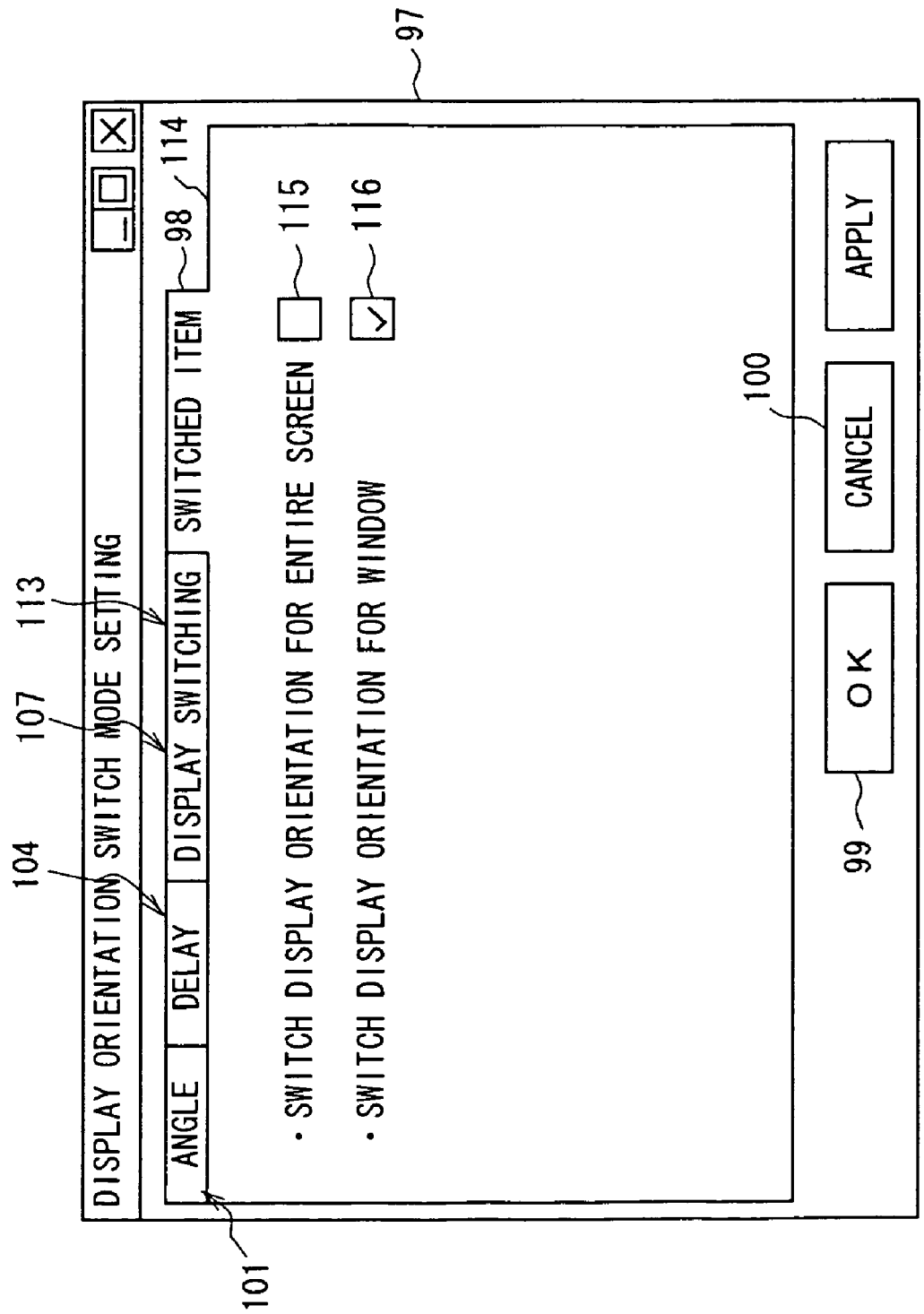
FIG. 17 is a schematic diagram illustrating a layout of a switched item setting area in the display mode setting screen.

Further, when the user moves the cursor onto a switched item setting field 113 in the menu bar 98 of the display mode setting screen 97 and clicks the mouse on the field 113, the CPU 30 displays a switched item setting area 114 in the display mode setting screen 97, as illustrated in FIG. 17.

The switched item setting area 114 includes check boxes 115, 116 for selecting an item for which the display orientation is changed in response to a change in the posture of the display section 3, i.e., for selecting whether to change the display orientation of the entire screen displayed on the liquid crystal panel 7 or to change the display orientation of only an arbitrary window of a plurality of first to third windows displayed on the liquid crystal panel 7.

Figure 18:
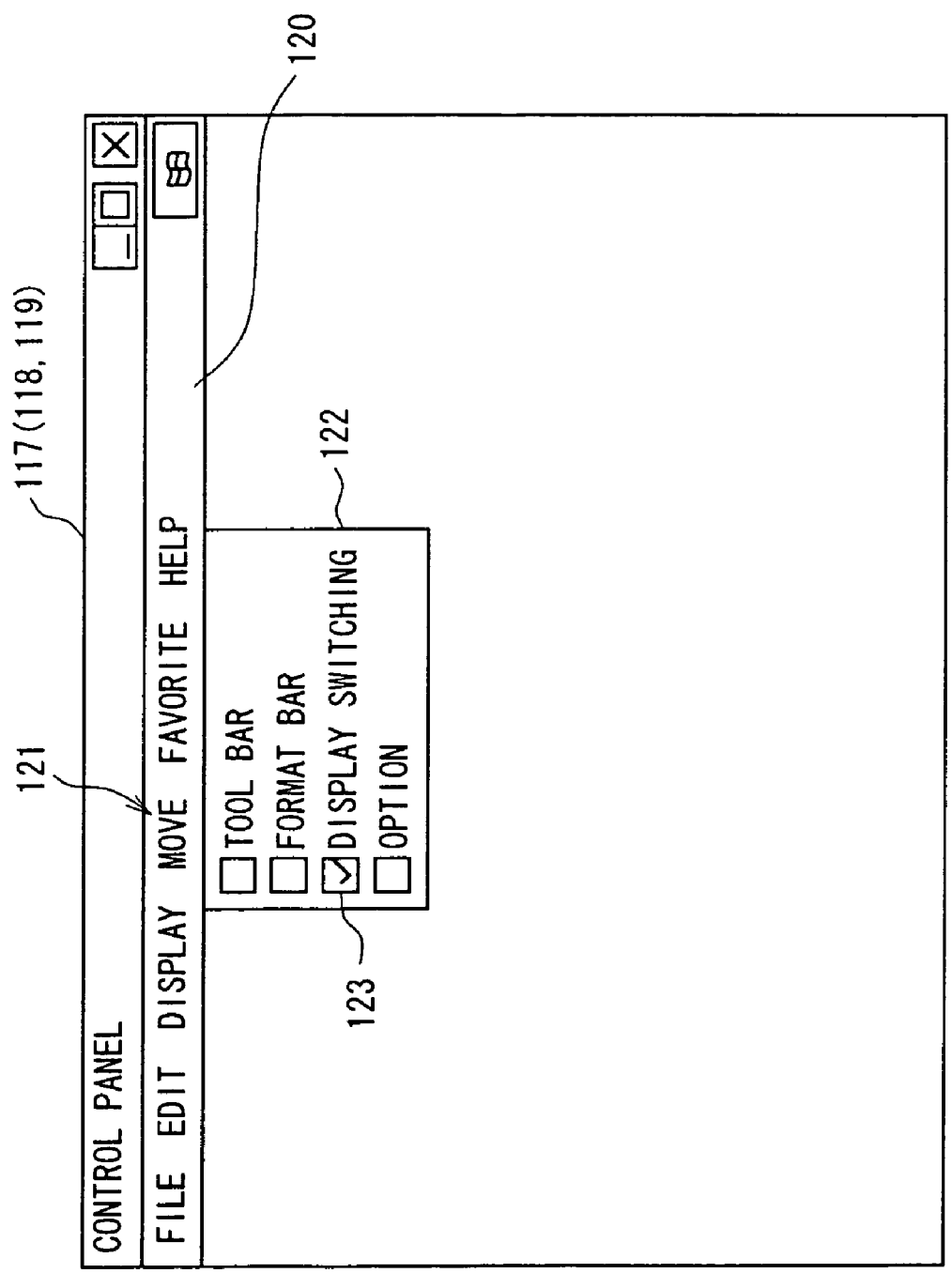
FIG. 18 is a schematic diagram used for explaining how to set rotation of first to third windows.

Specifically, as illustrated in FIG. 18, for the first to third windows 117 to 119, when the user moves the cursor onto a "display" menu 121 in the menu bar 120 and clicks the mouse on the menu 121, a pull-down menu 122 is displayed.

Then, the pull-down menu 122 includes a check box 123 for "switch display" which is valid only when the user checks in the check box 116 for changing the display orientation for displaying only an arbitrary one of the plurality of windows, i.e., first to third windows 117 to 119 in the aforementioned switched item setting area 114.

Figure 19:
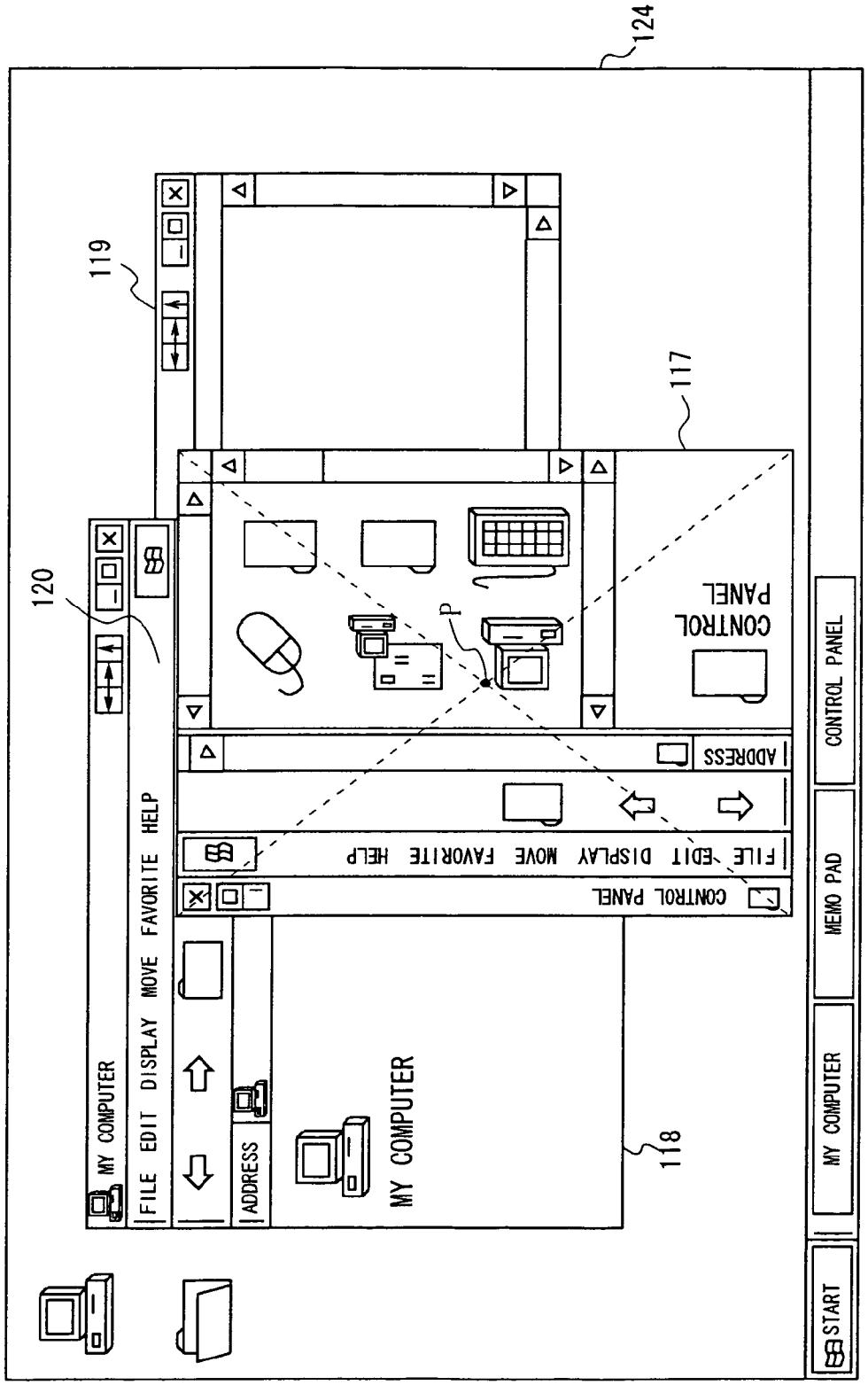
FIG. 19 is a schematic diagram used for explaining how to rotate an arbitrary one of the first to third windows.

Thus, as illustrated in FIG. 19, when the user checks in the check box 123 associated with "switch display" in the pull down menu 122, for example, in the first window 117 of the first to third windows 117 to 119, a change in the posture of the display section 3, if any, can cause only the first window 117 to be rotated about an intersection point P of its diagonals to change the orientation in which the first window 117 is displayed, and the remaining second and third windows 118, 119 and the desktop screen 124 to be displayed as they are without changing the display orientation.

In this event, even with a check entered by the user in the check box 109 associated with the aforementioned "start display orientation switch mode," if the display section 3 is set not to arbitrarily end the switching of the display orientation, and the delay time is not set (i.e., the delay time is set to "0" seconds), the CPU 30 displays a multi-window screen on the liquid crystal panel 7 or arbitrarily starts the switching of the display orientation with a multi-window screen displayed on the liquid crystal panel 7, and starts the first rotation display processing procedure RT1 illustrated in the aforementioned FIG. 10 based on the third rotation processing program.

Also, even with a check entered by the user in the check box 109 associated with the aforementioned "start display orientation switch mode," if the display section 3 is set not to arbitrarily end the switching of the display orientation, and the delay time is set to an arbitrary time period, the CPU 30 displays a multi-window screen on the liquid crystal panel 7 or arbitrarily starts the switching of the display orientation with a multi-window screen displayed on the liquid crystal panel 7, and starts the second rotation display processing procedure RT2 illustrated in the aforementioned FIG. 12 based on the third rotation processing program.

Figure 20:
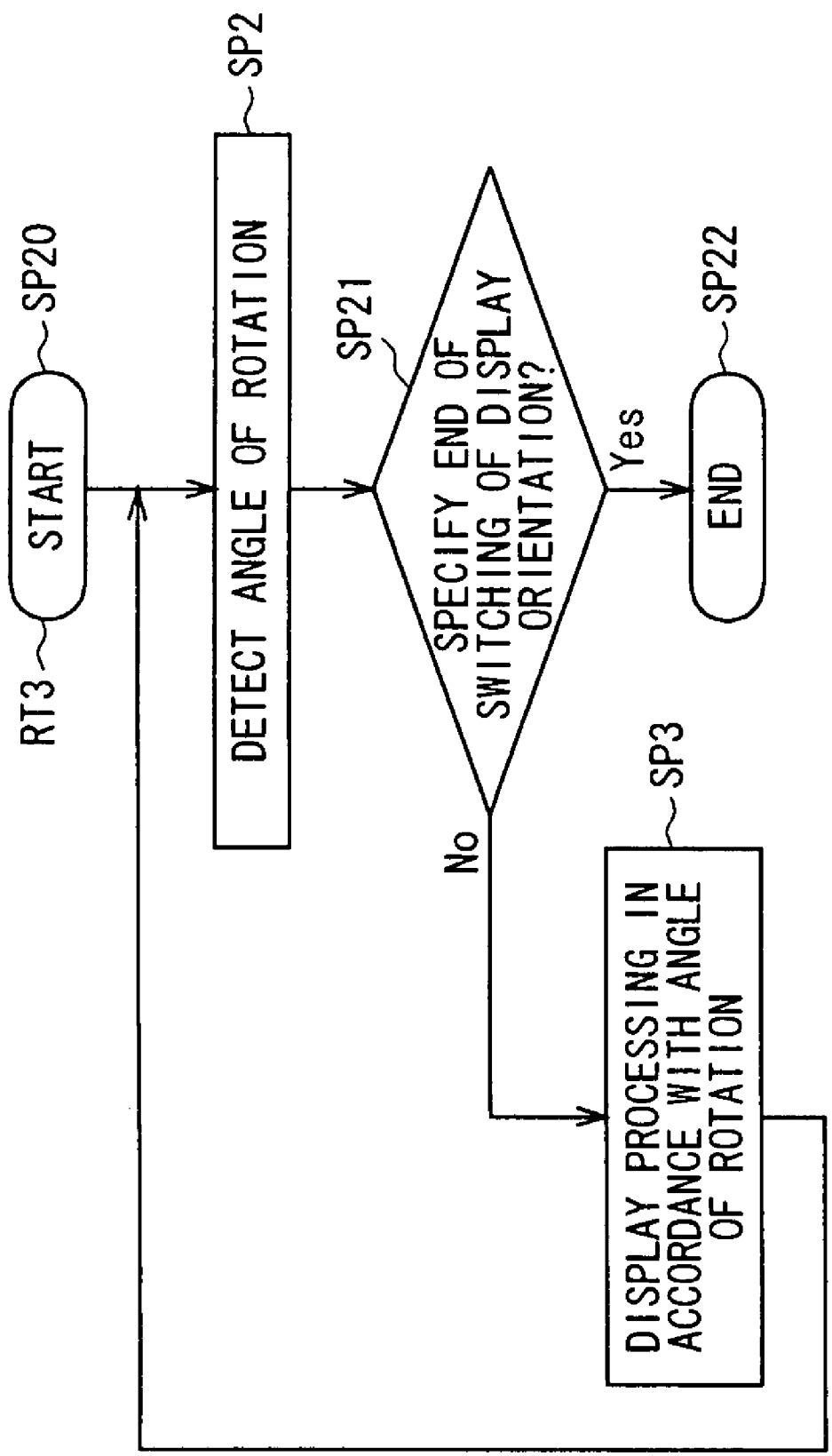
FIG. 20 is a flow chart illustrating a third rotation display processing procedure.

Further, when a check is entered by the user in the check box 109 associated with the aforementioned "start display orientation switch mode," the display section 3 is set to arbitrarily end the switching of the display orientation, and the delay time is not set (i.e., the delay time is set to "0" seconds), the CPU 30 displays a multi-window screen on the liquid crystal panel 7 or arbitrarily starts the switching of the display orientation with a multi-window screen displayed on the liquid crystal panel 7 and starts a third rotation display processing procedure RT3 illustrated in FIG. 20, in which parts corresponding to those in FIG. 10 are designated the same reference numerals, at step SP30 based on the third rotation processing program.

In this event, the CPU 30 proceeds to step SP21 subsequent to step SP2 unlike the aforementioned first rotation display processing procedure RT1. At step SP21, it is determined whether or not the user has depressed the operation key 4 for arbitrarily ending the switching of the display orientation. When the user does not depress the operation key 4 to cause a negative result, the CPU 30 proceeds to step SP3. Subsequently, the CPU 30 repeats a processing loop formed of steps SP21–SP3–SP2–SP21 until an affirmative result is returned at step SP21.

Conversely, if the user depresses the operation key 4 for arbitrarily ending the switching of the display orientation to cause an affirmative result at step SP21, the CPU 30 proceeds to the subsequent step SP22 to terminate the third rotation display processing procedure RT3.

Figure 21:
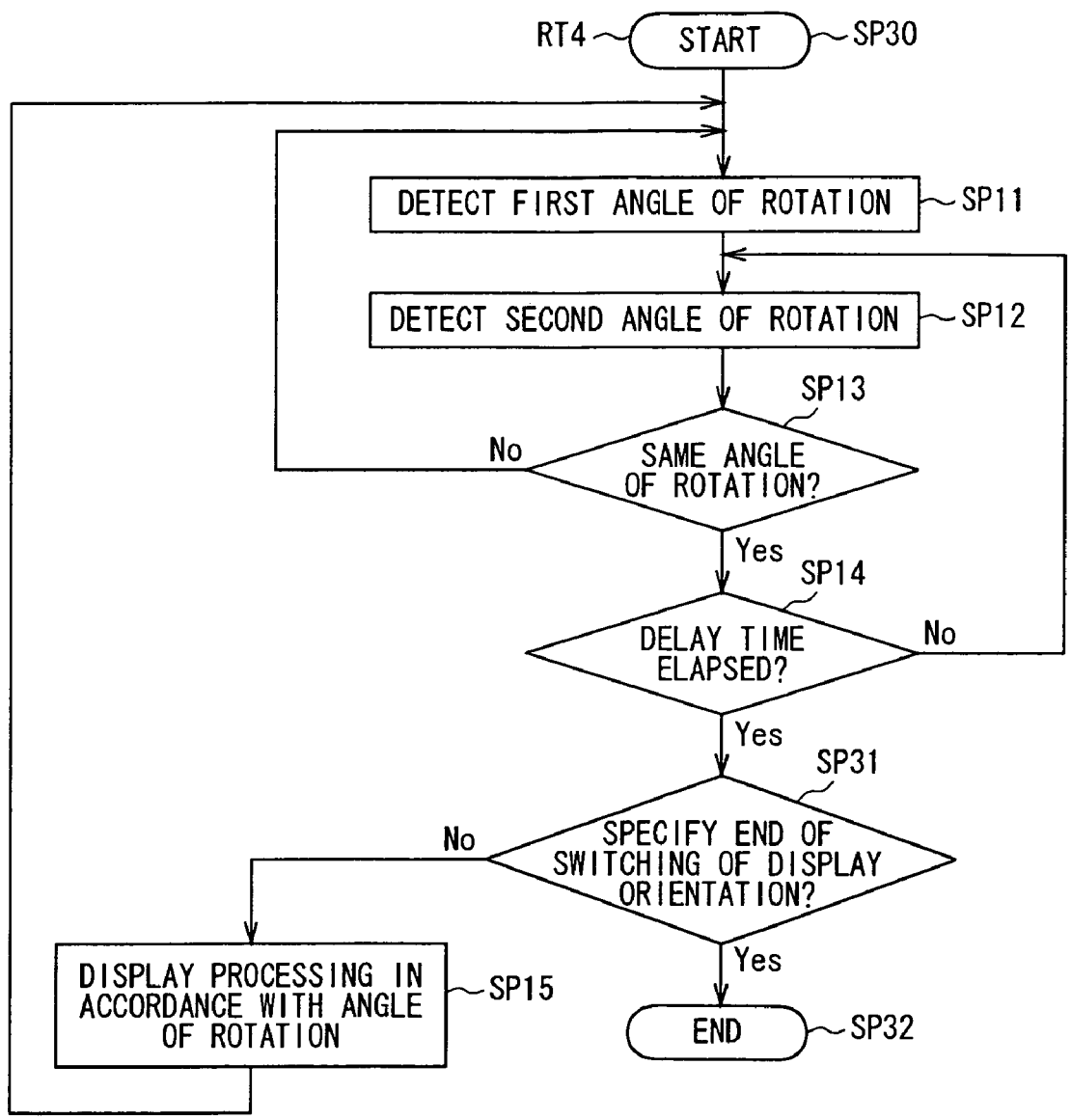
FIG. 21 is a flow chart illustrating a fourth rotation display processing procedure.

Further, when a check is entered by the user in the check box 109 associated with the aforementioned "start display orientation switch mode," the display section 3 is set to arbitrarily end the switching of the display orientation, and the delay time is set to an arbitrary time period, the CPU 30 displays a multi-window screen on the liquid crystal panel 7 or arbitrarily starts the switching of the display orientation with a multi-window screen displayed on the liquid crystal panel 7, and starts a fourth rotation display processing procedure RT4 illustrated in FIG. 21, in which parts corresponding to those in FIG. 12 are designated the same reference numerals, at step SP30 based on the third rotation processing program.

In this event, the CPU 30 proceeds to step SP31 subsequent to step SP14 unlike the aforementioned third rotation display processing procedure RT3. At step SP31, it is determined whether or not the user has depressed the operation key 4 for arbitrarily ending the switching of the display orientation. When the user does not depress the operation key 4 to cause a negative result, the CPU 30 proceeds to step SP15. Subsequently, the CPU 30 repeats a processing loop formed of steps SP31–S15–SP11–SP12–SP13–SP14–SP31 until an affirmative result is returned at step SP31.

Conversely, if the user depresses the operation key 4 for arbitrarily ending the switching of the display orientation to cause an affirmative result at step SP31, the CPU 30 proceeds to the subsequent step SP32 to terminate the fourth rotation display processing procedure RT4.

For reference, when the display section 3 is set to change the display orientation only for an arbitrary one of the first to third windows 117 to 119, the CPU 30 only changes the display orientation of the arbitrary one of the first to third windows 117 to 119, which are being displayed on the liquid crystal panel 7, at step SP4 and at step SP15, respectively, in the aforementioned first to fourth rotation display processing procedures RT1 to RT4.

Also, when the display section 3 is set to rotate the entire screen of the liquid crystal panel 7 with the desktop screen 83 only displayed on the liquid display panel 7, the CPU 30 changes the display orientation of the desktop screen 83 which is being displayed on the liquid crystal panel 7, at step SP3 and at step SP15, respectively, in the first to fourth rotation display processing procedures RT1 to RT4.

Further, when the display section 3 is set to change the display orientation for an arbitrary one of the first to third windows 117 to 119 with the desktop screen 83 only displayed on the liquid crystal display panel 7, the CPU 30 does not change the display orientation of the desktop screen 83, which is being displayed on the liquid crystal panel 7, at step SP3 and at step SP15, respectively, in the first to fourth rotation display processing procedures RT1 to RT4.

With the configuration described above, the personal computer 95 displays the display mode setting screen 97 as required on the liquid crystal panel 7 of the display section 3 to allow the user to set a variety of conditions including the rotation angle range for determining the posture of the display section 3, the presence or absence of the switching of the display orientation, the delay time, and so on, on the display mode setting screen 97.

Therefore, if the user selects not to switch the display orientation, for example, when a multi-window screen is being displayed on the liquid crystal panel 7, the personal computer 95 can readily display the multi-window screen (for example, having a predetermined image) upside down on the liquid crystal panel 7 if the user wants to see it.

Also, with the personal computer 95, when the display section 3 is set to change the orientation in which a multi-window screen is displayed on the liquid crystal display 7, it is possible to prevent surrounding persons from snooping the contents displayed on the liquid crystal panel 7, for protecting the privacy, depending on how far the display section 3 is positioned away from the base section 2, when the user changes the way he holds the personal computer 95 in a train or the like just like he opens a book. In this event, however, if the user has selected not to change the display orientation for any of the first to third windows 84 to 86, which is displaying important image information, characters and so on in the important image information are displayed in a lateral orientation or upside down to surrounding persons, even if they attempt to snoop the liquid crystal panel 7, thereby making it possible to degrade the visibility of the liquid crystal panel 7 and consequently more strictly protect the privacy.

According to the configuration described above, the display mode setting screen 97 is displayed on the liquid crystal panel 7 of the display section 3 as required to allow the user to set a variety of conditions including the rotation angle range for determining the posture of the display section 3, the presence or absence of the switching of the display orientation, the delay time, and so on, on the display mode setting screen 97, thereby making it possible to further improve the usability of the personal computer in addition to the effects produced by the aforementioned first and second embodiments.

(4) Other Embodiments

The foregoing embodiments have been described for the case where the CPU 30 captures the X-axis angular velocity detecting data from the input interface 60 at predetermined operation periods. The present invention, however, is not limited to this manner of capturing the angular velocity detecting data. Alternatively, the three-axis gyro sensor 61 may send the X-axis angular velocity detecting data to the CPU 30 at all times, such that the CPU 30 monitors the amount of variations in the angular velocity detecting data and detects the angle of rotation of the display section 3 when the angular velocity data has changed. Also alternatively, the CPU 30 may detect at all times the angle of rotation of the display section 3 based on the X-axis angular velocity detecting data supplied from the three-axis gyro sensor 61. Furthermore, the three-axis gyro sensor 61 may intermittently send angular velocity data on rotation of the display section 3 about X-axis, Y-axis and Z-axis to the CPU 30 at predetermined timing.

Also, while in the foregoing embodiments, the three-axis gyro sensor 61 is mounted within the display section 3, the present invention is not limited to the three-axis gyro sensor 61 mounted within the display section 3, and the three-axis gyro sensor 61 may be mounted within the base section 2.

Further, in the foregoing embodiments, when the posture of the display section 3 is changed, the personal computer changes the display orientation individually for each of the multi-window screen 83, the desktop screen 84, the first to third windows 85 to 87, 117 to 119. The present invention, however, is not limited to this manner of changing the display orientation. Alternatively, the display orientation of image information may be changed in a variety of groups, such as the image information display area 92 of the first to third windows 85 to 87, 117 to 119, or the like.

Further, while the foregoing embodiments have been described in connection with the aforementioned notebook type personal computer 1 to which the present invention is applied, the present invention is not limited to this type of computer but can be widely applied to a variety of other information processing apparatus such as portable information communication terminals, portable video display apparatus, and so on which have a display section.

Further, in the foregoing embodiments, the three-axis gyro sensor 61 and the CPU 30 are applied as angular component detecting means for detecting an angular component in a plane parallel with a display surface when the posture of the display surface is changed. The present invention, however, is not limited to such particular means. Alternatively, a variety of angular component detecting means may be applied for this purpose as long as they can detect an angular component in the plane parallel with the display surface when display means having a display surface is subjected to a change in posture.

Further, in the foregoing embodiments, the CPU 30 is applied as display orientation control means for displaying image information on a display surface, and for controlling a display orientation of the image information by rotating the image information in parallel with the display surface based on the result of detection on an angular component derived from the angular component detecting means. The present invention, however, is not limited to this particular implementation. Alternatively, a variety of other display orientation control means may be applied for this purpose as long as they can display image information on a display surface and control a display orientation of the image information by rotating the image information in parallel with the display surface based on the result of detection on an angular component derived from the angular component detecting means.

As described above, according to the present invention, an information processing apparatus comprises angular component detecting means for detecting an angular component in a plane parallel with a display surface, when the posture of the display surface is changed, and display orientation control means for displaying image information on the display surface, and for controlling a display orientation of the image information by rotating the image information in parallel with the display surface based on the result of detection on the angular component derived from the angular component detecting means, so that a degraded visibility can be prevented by readily rotating the image information displayed on the display surface, even if the user changes the posture of the information processing apparatus, when used in the middle of a travel, in order to provide better portability or in order to prevent surrounding persons from snooping the image information, thereby making it possible to realize the information processing apparatus which can be readily used even in the middle of a travel.

Also, an information processing method comprises a display step of displaying image information on a display surface, an angular component detecting step of detecting an angular component in a plane parallel with the display surface, when the posture of the display surface is changed, and a display orientation control step of controlling a display orientation of the image information by rotating the image information in parallel with the display surface based on the angular component detected at the angular component detecting step, so that a degraded visibility can be prevented by readily rotating the image information displayed on the display surface, even if the user changes the posture of the information processing apparatus, when used in the middle of a travel, in order to provide better portability or in order to prevent surrounding persons from snooping the image information, thereby making it possible to realize the information processing method which allows the user to readily use the information processing apparatus even in the middle of a travel.

Further, a medium causes an information processing apparatus to execute a program having a display step of displaying image information on a display surface, an angular component detecting step of detecting an angular component in a plane parallel with the display surface, when the posture of the display surface is changed, and a display orientation control step of controlling a display orientation of the image information by rotating the image information in parallel with the display surface based on the angular component detected at the angular component detecting step, so that a degraded visibility can be prevented by readily rotating the image information displayed on the display surface, even if the user changes the posture of the information processing apparatus, when used in the middle of a travel, in order to provide better portability or in order to prevent surrounding persons from snooping the image information, thereby making it possible to realize the medium which allows the user to readily use the information processing apparatus even in the middle of a travel.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information processing apparatus comprising:
a display screen;
posture detecting means for detecting an angular component of a change of posture of the display screen;
means for setting a first mode in which all of a plurality of separate images configured to be displayed on the display screen are to be rotated, a second mode in which a selected image of the plurality of separate images is to be rotated, and a third mode in which none of the plurality of separate images are to be rotated;
means for selecting the selected image when the second mode is set; and
displaying direction control means for displaying the plurality of separate images on said display screen, and for controlling a direction of display of the selected image by rotating the selected image according to the angular component of the change of posture of the display screen detected by the posture detecting means and not rotating at least one of the other of the plurality of images,
said displaying direction control means controls the direction of display of said selected image by rotating said selected image when the angular component of the change of posture of the display screen detected by the posture detecting means remains unchanged for a predetermined time after the posture detecting means detects the angular component of the change of posture of the display screen.

2. The information processing apparatus according to claim 1, wherein
said displaying direction control means displays a plurality of windows as the plurality of images, and controls the direction of display of a selected window from the plurality of windows according to the rotation of the display screen.

3. The information processing apparatus according to claim 1, wherein
said displaying direction control means controls the direction of display of said selected image by rotating said selected image according to the rotation of the display screen beyond a predetermined range.

4. The information processing apparatus according to claim 3, wherein
said displaying direction control means controls the direction of display of said selected image by rotating said selected image when the display screen remains rotated beyond the predetermined range after a predetermined time.

5. An information processing apparatus comprising:
a display screen;
posture detecting means for detecting an angular component of a change of posture of the display screen;
means for setting a first mode in which all of separate images configured to be displayed on the display screen are to be rotated, a second mode in which an image of the separate images is to be rotated, and a third mode in which none of the separate images are to be rotated;
means for selecting the image when the second mode is set; and
displaying direction control means for displaying the separate images on said display screen, and for controlling a direction of display of the image by rotating said image according to the angular component of the change of posture of the display screen detected by the posture detecting means and not rotating at least one of the other images, wherein
said displaying direction control means controls the direction of display of said image by rotating said image according to the change of posture of the display screen beyond a predetermined range when the angular component of the change of posture of the display screen detected by the posture detecting means remains unchanged for a predetermined time after the posture detecting means detects the angular component of the change of posture of the display screen.

6. The information processing apparatus according to claim 5, wherein
said displaying direction control means controls the direction of display of said image by rotating said image when the display screen remains rotated beyond the predetermined range after a predetermined time.

7. An information processing method comprising:
a display processing step of displaying a plurality of separate images on a display screen;
a detection processing step of detecting an angular component of a change of posture of the display screen;
a mode setting step of setting a first mode in which all of the plurality of separate images are to be rotated, a second mode in which a selected image of the plurality of separate images is to be rotated, and a third mode in which none of the plurality of separate images are to be rotated;
a selection processing step of selecting the selected image when the second mode is set; and
a displaying direction control processing step of controlling a direction of display of the selected image by rotating the selected image according to the angular component of the change of posture of the display screen detected by the detection processing step and not rotating at least one of the other of the plurality of images,
said displaying direction control processing step further controlling the direction of display of the selected image when the angular component of the change of posture of the display screen detected by the detection processing step remains unchanged for a predetermined time after the detection processing detects the angular component of the change of posture of the display screen.

8. The information processing method according to claim 7, wherein
said display processing step displays a plurality of windows as the plurality of images, and controls the direction of display of a selected window from the plurality of windows according to the rotation of the display screen.

9. The information processing method according to claim 7, wherein
said displaying direction control processing step rotates said selected image according to the rotation of the display screen beyond a predetermined range.

10. The information processing method according to claim 9, wherein
said displaying direction control processing step rotates said selected image when the display screen remains rotated beyond the predetermined range after a predetermined time.

11. An information processing method comprising:
a display processing step of displaying separate images on a display screen;
a detection processing step of detecting an angular component of a change of posture of the display screen;
a mode setting step of setting a first mode in which all of the separate images are to be rotated, a second mode in which an image of the separate images is to be rotated, and a third mode in which none of the separate images are to be rotated;
a selection processing step of selecting the image when the second mode is set; and
a displaying direction control processing step of controlling a direction of display of the image by rotating said image according to the angular component of the change of posture of the display screen detected by the detection processing step and not rotating at least one of the other images wherein
said displaying direction control processing step rotates said image according to the change of posture of the display screen beyond a predetermined range when the angular component of the change of posture of the display screen detected by the detection processing step remains unchanged for a predetermined time after the detection processing detects the angular component of the change of posture of the display screen.

12. The information processing method according to claim 11, wherein
said displaying direction control processing step rotates said image when the display screen remains rotated beyond the predetermined range after a predetermined time.

13. A computer-readable medium encoded with a program which causes an information processing apparatus to execute a processing, the processing comprising:
a display processing step of displaying a plurality of separate images on a display screen;
a detection processing step of detecting an angular component of a change of posture of the display screen;
a mode setting step of setting a first mode in which all of the plurality of separate images are to be rotated, a second mode in which a selected image of the plurality of separate images is to be rotated, and a third mode in which none of the plurality of separate images are to be rotated;
a selection processing step of selecting the selected image when the second mode is set; and
a displaying direction control processing step of controlling a direction of display of the selected image by rotating said selected image according to the angular component of the change of posture of the display screen detected by the detection processing step and not rotating at least one of the other of the plurality of images,
said displaying direction control processing step further controlling the direction of display of the selected image when the angular component of the change of posture of the display screen detected by the detection processing step remains unchanged for a predetermined time after the detection processing detects the angular component of the change of posture of the display screen.

14. The computer-readable medium according to claim 13, wherein
said displaying direction control processing step rotates said selected image according to the rotation of the display screen beyond a predetermined range.

15. The computer-readable medium according to claim 14, wherein
said displaying direction control processing step rotates said selected image when the display screen remains rotated beyond the predetermined range after a predetermined time.

16. A computer-readable medium encoded with a program which causes an information processing apparatus to execute a processing, the processing comprising:
a display processing step of displaying separate images on a display screen;
a detection processing step of detecting an angular component of a change of posture of the display screen;
a mode setting step of setting a first mode in which all the separate images are to be rotated, a second mode in which an image of the separate images is to be rotated, and a third mode in which none of the separate images are to be rotated;
a selection processing step of selecting the image when the second mode is selected; and
a displaying direction control processing step of controlling a direction of display of the image by rotating said image according to the angular component of the change of posture of the display screen detected by the detection processing step and not rotating at least one of the other images,
said displaying direction control processing step rotates said image according to the change of posture of the display screen beyond a predetermined range when the angular component of the change of posture of the display screen detected by the detection processing step remains unchanged for a predetermined time after the detection processing detects the angular component of the change of posture of the display screen.

17. The computer-readable medium according to claim 16, wherein
said displaying direction control processing step rotates said image when the display screen remains rotated beyond the predetermined range after a predetermined time.

18. An information processing apparatus comprising:
a display screen;
a sensor configured to detect an angular component of a change of posture of the display screen;
a mode setting unit configured to set a first mode in which all of a plurality of separate images configured to be displayed on the display screen are to be rotated, a second mode in which a selected image of the plurality of separate images is to be rotated, and a third mode in which none of the plurality of separate images are to be rotated;
a selecting unit configured to select the selected image when the second mode is set; and
a display direction control unit configured to display the plurality of separate images on said display screen, and for controlling a direction of display of the selected image by rotating the selected image according to the angular component of the change of posture of the display screen detected by the sensor and not rotating at least one of the other of the plurality of images,
said display direction control unit further configured to control the direction of display of said selected image by rotating said selected image when the angular component of the change of posture of the display screen detected by the sensor remains unchanged for a predetermined time after the sensor detects the angular component of the change of posture of the display screen.

19. The information processing apparatus according to claim 18, wherein said display direction control unit is further configured to display a plurality of windows as the plurality of images, and control the direction of display of a selected window from the plurality of windows according to the change of posture of the display screen.

20. The information processing apparatus according to claim 18, wherein said display direction control unit is further configured to control the direction of display of said selected image by rotating said selected image according to the rotation of the display screen beyond a predetermined range.

21. The information processing apparatus according to claim 20, wherein said display direction control unit is further configured to control the direction of display of said selected image by rotating said selected image when the display screen remains rotated beyond the predetermined range after a predetermined time.

* * * * *

UNITED STATES PATENT AND TRADEMARK OFFICE
CERTIFICATE OF CORRECTION

PATENT NO. : 7,164,432 B1 Page 1 of 1
APPLICATION NO. : 09/557035
DATED : January 16, 2007
INVENTOR(S) : Ryoji Amemiya It is certified that error appears in the above-identified patent and that said Letters Patent is hereby corrected as shown below:

Column 7, line 35, change "steering" to --starting--.

Signed and Sealed this

Twentieth Day of November, 2007

JON W. DUDAS
*Director of the United States Patent and Trademark Office*